United States Patent
Matsuzawa et al.

(10) Patent No.: US 12,437,582 B2
(45) Date of Patent: Oct. 7, 2025

(54) INFORMATION PROCESSING DEVICE, INFORMATION PROCESSING METHOD, AND PROGRAM

(71) Applicant: SONY GROUP CORPORATION, Tokyo (JP)

(72) Inventors: Sota Matsuzawa, Tokyo (JP); Ayaka Nishi, Kanagawa (JP); Masatomo Kurata, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 434 days.

(21) Appl. No.: 17/921,224

(22) PCT Filed: Feb. 4, 2021

(86) PCT No.: PCT/JP2021/004073
§ 371 (c)(1),
(2) Date: Oct. 25, 2022

(87) PCT Pub. No.: WO2021/240889
PCT Pub. Date: Dec. 2, 2021

(65) Prior Publication Data
US 2023/0162533 A1 May 25, 2023

(30) Foreign Application Priority Data
May 28, 2020 (JP) ................. 2020-092805

(51) Int. Cl.
*G06V 40/20* (2022.01)
*G01P 15/18* (2013.01)
(Continued)

(52) U.S. Cl.
CPC .............. *G06V 40/25* (2022.01); *G01P 15/18* (2013.01); *G06F 21/32* (2013.01);
(Continued)

(58) Field of Classification Search
CPC ........ G06V 40/25; G06V 20/52; G01P 15/18; G06F 21/32; G06Q 20/4014; G06Q 50/10;
(Continued)

(56) References Cited

U.S. PATENT DOCUMENTS

2016/0202065 A1* 7/2016 Chen ................. G06T 7/20
382/103
2016/0335509 A1* 11/2016 Nakata ................ G08G 1/005
2024/0427851 A1* 12/2024 Asaumi ............ G06F 21/1015

FOREIGN PATENT DOCUMENTS

JP   H06-340862 A   12/1994
JP   2004-096501 A   3/2004
(Continued)

*Primary Examiner* — John B Strege
(74) *Attorney, Agent, or Firm* — Paratus Law Group, PLLC

(57) ABSTRACT

There is provided an information processing device, an information processing method, and a program capable of accurately identifying a person imaged in a captured image. The information processing device includes a control unit configured to perform control for associating a person imaged in a captured image with a user of an information processing terminal based on a check between movement information acquired from information detected by the information processing terminal carried by the user and movement information of one or more persons acquired from the captured image and a check between state information of the user acquired from the information processing terminal and state information of the one or more persons acquired from the captured image.

20 Claims, 29 Drawing Sheets

(51) Int. Cl.
*G06F 21/32* (2013.01)
*G06Q 20/40* (2012.01)
*G06T 7/20* (2017.01)
*G06T 7/50* (2017.01)
*G06T 7/70* (2017.01)

(52) U.S. Cl.
CPC ........... *G06Q 20/4014* (2013.01); *G06T 7/20* (2013.01); *G06T 7/50* (2017.01); *G06T 7/70* (2017.01); *G06T 2207/30196* (2013.01); *G06T 2207/30241* (2013.01); *G06T 2207/30244* (2013.01)

(58) Field of Classification Search
CPC .... G06T 7/20; G06T 7/50; G06T 7/70; G06T 2207/30196; G06T 2207/30241; G06T 2207/30244
See application file for complete search history.

(56) References Cited

FOREIGN PATENT DOCUMENTS

| | | |
|---|---|---|
| JP | 2009-284442 A | 12/2009 |
| JP | 2013-210844 A | 10/2013 |
| JP | 2016-212675 A | 12/2016 |
| JP | 2018-093283 A | 6/2018 |

* cited by examiner

Fig. 24

| RECOGNIZED ACTIVITY | SERVICE PROVIDED TO USER |
|---|---|
| WATCH PRODUCT DISPLAYED ON SHELF | • DELIVER COUPON |
| PICK UP PRODUCT DISPLAYED ON SHELF | • DELIVER PRODUCT INFORMATION SUCH AS MATERIAL AND PRODUCTION AREA |
| HAND OVER PRODUCT USER DESIRES TO PURCHASE TO CLERK IN FRONT OF CASH REGISTER | • NOTIFY OF PAYMENT INFORMATION |
| RESTING IN OPEN SPACE FOR LONG TIME | • ASK IF HE OR SHE IS SICK |
| LINED UP AT RESTROOM | • RECOMMEND OTHER EMPTY RESTROOMS |
| (CHILD) IS CRYING | • PRESENT CONTACT INFORMATION FOR LOST CHILD CENTER |
| RUNNING IN HALL | • NOTIFY OF ALERT |
| LOOKING AROUND AWKWARDLY | • ASK IF HE OR SHE IS LOOKING FOR SOMETHING |

INFORMATION PROCESSING DEVICE, INFORMATION PROCESSING METHOD, AND PROGRAM

CROSS REFERENCE TO PRIOR APPLICATION

This application is a National Stage Patent Application of PCT International Patent Application No. PCT/JP2021/004073 (filed on Feb. 4, 2021) under 35 U.S.C. § 371, which claims priority to Japanese Patent Application No. 2020-092805 (filed on May 28, 2020), which are all hereby incorporated by reference in their entirety.

TECHNICAL FIELD

The present disclosure relates to an information processing device, an information processing method, and a program.

BACKGROUND ART

In recent years, an indoor positioning technology has been required for use in marketing research and personalization of customer experiences. For example, there is a technique for obtaining relative movement information, whether indoors or outdoors, using inertial sensors such as an acceleration sensor, an angular velocity sensor, and a geomagnetic sensor. For example, PTL 1 below discloses an indoor positioning method that calculates position information using both a movable camera provided indoors and a mobile terminal possessed by a pedestrian which has a pedestrian dead reckoning (PDR) function.

CITATION LIST

Patent Literature

[PTL 1]
JP 6340862 B

SUMMARY

Technical Problem

However, in PTL 1, to cover a wide range, the movable camera is rotated in the direction of that of position information obtained from a mobile terminal of a pedestrian to capture an image thereof, but correct control is difficult when the position information contains an error. Also, an association between a person in the angle of view and a user is not considered.

Therefore, the present disclosure proposes an information processing device, an information processing method, and a program capable of accurately identifying a person imaged in a captured image.

Solution to Problem

The present disclosure proposes an information processing device including a control unit configured to perform control for associating a person imaged in a captured image with a user of an information processing terminal based on a check between movement information acquired from information detected by the information processing terminal carried by the user and movement information of one or more persons acquired from the captured image and a check between state information of the user acquired from the information processing terminal and state information of the one or more persons acquired from the captured image.

The present disclosure proposes an information processing method including a processor performing control for associating a person imaged in a captured image with a user of an information processing terminal based on a check between movement information acquired from information detected by the information processing terminal carried by the user and movement information of one or more persons acquired from the captured image and a check between state information of the user acquired from the information processing terminal and state information of the one or more persons acquired from the captured image.

The present disclosure proposes a program for causing a computer to function as a control unit configured to perform control for associating a person imaged in a captured image with a user of an information processing terminal based on a check between movement information acquired from information detected by the information processing terminal carried by the user and movement information of one or more persons acquired from the captured image and a check between state information of the user acquired from the information processing terminal and state information of the one or more persons acquired from the captured image.

BRIEF DESCRIPTION OF DRAWINGS

FIG. 24 is a diagram illustrating a recognized activity and a service provided to a user according to an application example of the present embodiment.

DESCRIPTION OF EMBODIMENTS

Figure 1:
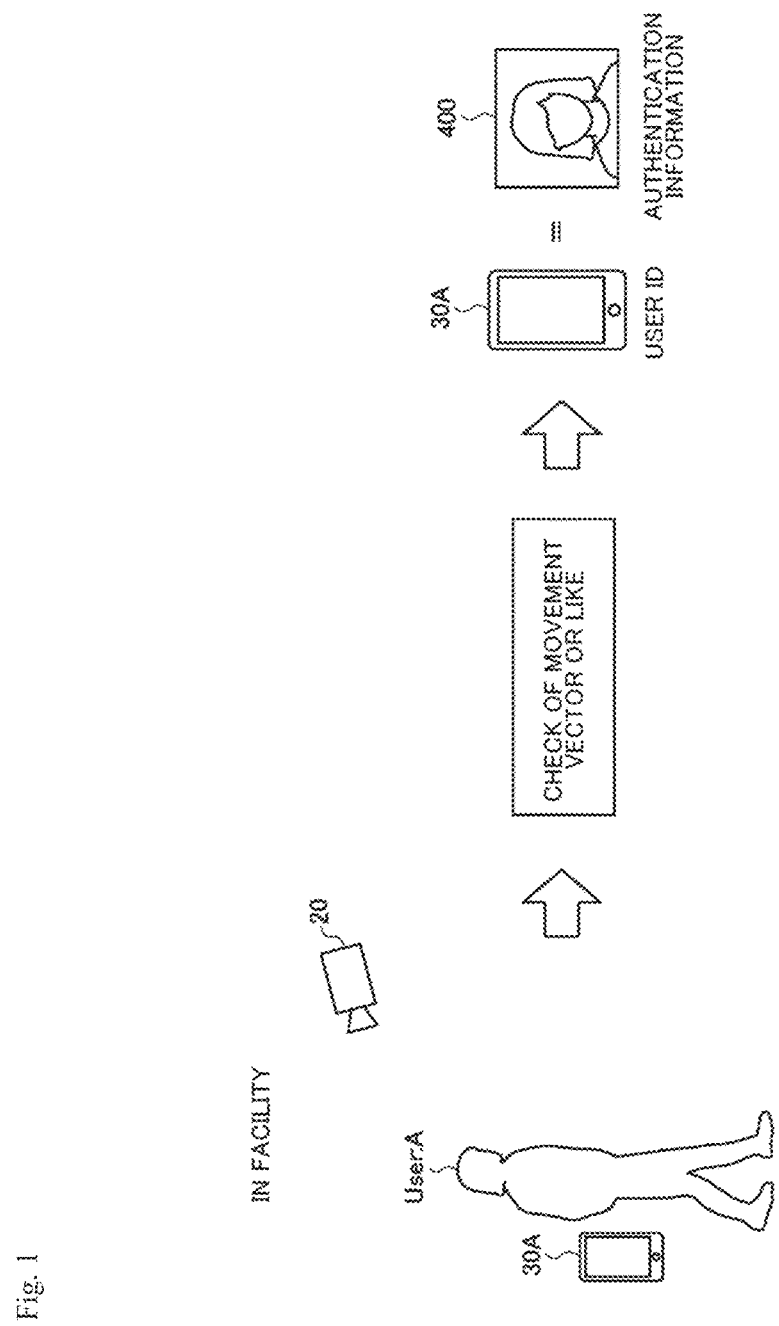
FIG. 1 is a diagram illustrating an outline of an information processing system according to an embodiment of the present disclosure.

Preferred embodiments of the present disclosure will be described in detail with reference to the accompanying drawings below. In the present specification and drawings, components having substantially the same functional configuration are designated by the same reference numerals and thus redundant description will be omitted.

A description will be given in the following order.
1. Outline of information processing system according to embodiment of present disclosure
2. Exemplary configurations
3. Exemplary operation process
3-1. Operation process of information processing system
3-2. Operation process of environmental camera 20
3-3. Operation process of server 10
4. Check process and check confidence score calculation
4-1. Flow of check process
4-2. Movement vector check and check confidence score calculation
4-3. Walking step check and check confidence score calculation
4-4. Positional relationship check and check confidence score calculation
4-5. Activity information check and check confidence score calculation
4-6. Movement pattern check and check confidence score calculation
4-7. Summation of check confidence scores
5. Application examples
6. Summary 1. Outline of Information Processing System According to Embodiment of Present Disclosure FIG. 1 is a diagram illustrating an outline of an information processing system according to an embodiment of the present disclosure. In the present embodiment, it is possible to detect a movement trajectory, in a facility such as a shopping mall, of a user who has visited the facility with high accuracy by using data from a sensor provided in an information processing terminal carried by the user and video from one or more environmental cameras arranged in the facility. It is also possible to detect the movement trajectory in the facility of the user who has visited the facility while maintaining the anonymity of the user by identifying the user in the facility through a movement trajectory check. The movement trajectory is a movement route and more specifically includes position information (for example, global coordinates) and time information.

For example, in an example shown in FIG. 1, a user terminal 30A (an example of an information processing terminal) possessed by a user A calculates a movement vector of the user A as a movement trajectory based on sensing data, for example, using pedestrian dead reckoning (PDR) (which is an example of indoor positioning). Although the letter A is added after the reference numeral 30 to indicate that the user A possesses the user terminal 30, the configuration of the user terminal 30A is the same as that of a user terminal 30 which will be described later.

On the other hand, each of environmental cameras 20 provided in the facility calculates the movement vector of the user who is within its angle of view, for example, by performing face detection and body detection from a captured image. In the present embodiment, for example, it may be assumed that the user is imaged by chance in video captured by the environmental camera 20, rather than the environmental camera 20 intentionally photographing the target user. Alternatively, it is assumed that the environmental camera 20 intentionally photographs a user, and thus for example, the environmental camera 20 tracks and photographs a specific face or a camera of a self-propelled robot or the like tracks and photographs a specific person. In the present embodiment, the cameras arranged in the facility are referred to as "environmental cameras" since they continuously capture images of their surrounding environment. Each environmental camera is also referred to as a surveillance camera. The environmental camera is not limited to a fixed camera and may be a camera mounted on a moving object such as a self-propelled robot or a drone. A wide-angle lens may also be used for the camera.

Then, by checking movement vectors acquired by the user terminal 30A and the environmental camera 20, a person imaged in the captured image can be associated with the user terminal 30A possessed by the person. As a result, for example, a user ID (an example of an identification character string for identifying a user which is, for example, a numerical value) acquired from the user terminal 30A is associated with authentication information such as a facial image 400 detected from the captured image (information that can be identified from the appearance of a person). Then, various services such as performing payment processing can be provided using the authentication information. The user A saves the time and effort of registering himself or herself since he or she automatically registers his or her own authentication information just by walking in the facility. The privacy of the user A can be protected by deleting the automatically registered authentication information when he or she leaves the facility.

PDR used as an indoor positioning means may accumulate errors with the passage of time due to its characteristics of calculation of relative movement vectors. In the present embodiment, PDR is combined with the results of analyzing video from the environmental cameras, such that the absolute position of the user terminal (that is, the user) indoors can be detected with high accuracy.

Facilities assumed here include, in addition to a shopping mall, various places such as, for example, a supermarket, a convenience store, a bookstore, a restaurant, an apparel store, a retail store, a spa (a hot bath facility), a library, a public hall, a school, a station, a hotel, a hospital, an indoor/outdoor event place, a movie theater, a resort facility, a sports facility, an amusement park, a theme park, a parking lot, a park, or a shrine/temple.

(Movement Vector Check)

Here, a movement vector check will be described. First, the user terminal 30 calculates movement information (specifically, the movement trajectory) of the user (carrying the user terminal 30) based on sensing data detected by motion sensors such as an acceleration sensor, an angular velocity sensor, and a magnetic sensor. The motion sensors may include an inertial measurement unit (IMU) that detects acceleration and angular velocity of three axes. More specifically, the user terminal 30 calculates a movement vector, for example, by PDR. PDR is a positioning means capable of obtaining relative movement information, whether indoors or outdoors, based on acceleration, angular velocity, and magnetism. On the other hand, the environmental camera 20 performs face detection, body detection, feature point detection, posture detection, or the like (that is, detection of a moving object) on each frame from captured video and calculates a relative movement trajectory from changes in position (that is, movements) of the same person (same moving object) imaged in each frame. When a plurality of people are imaged in the captured image, the environmental camera 20 calculates the movement trajectory of each person.

Figure 2:
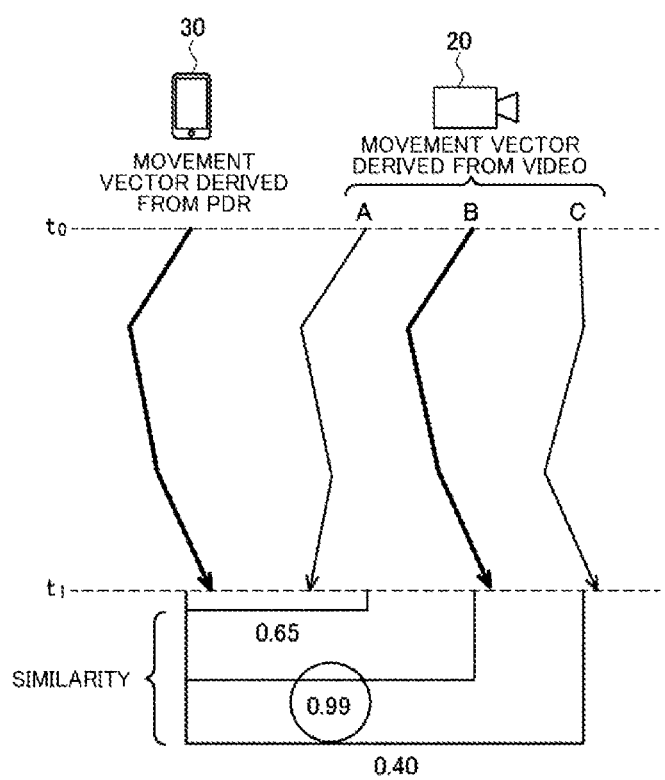
FIG. 2 is a diagram illustrating a movement vector check according to the present embodiment.

Then, checking each movement trajectory leads to success in associating, among one or more persons imaged in the angle of view, the same person imaged in every frame with a user terminal 30 possessed by the person. FIG. 2 is a diagram illustrating a movement vector check according to the present embodiment. For example, when there are a movement vector that the user terminal 30 has calculated using PDR and movement vectors A, B, and C that the environmental camera 20 has calculated from a captured image as shown in FIG. 2, the movement vector check determines a movement vector most similar to the movement vector derived from PDR. For example, cosine similarity may be used to determine similarity. Without being limited to cosine similarity, known techniques can be applied to the check.

Figure 3:
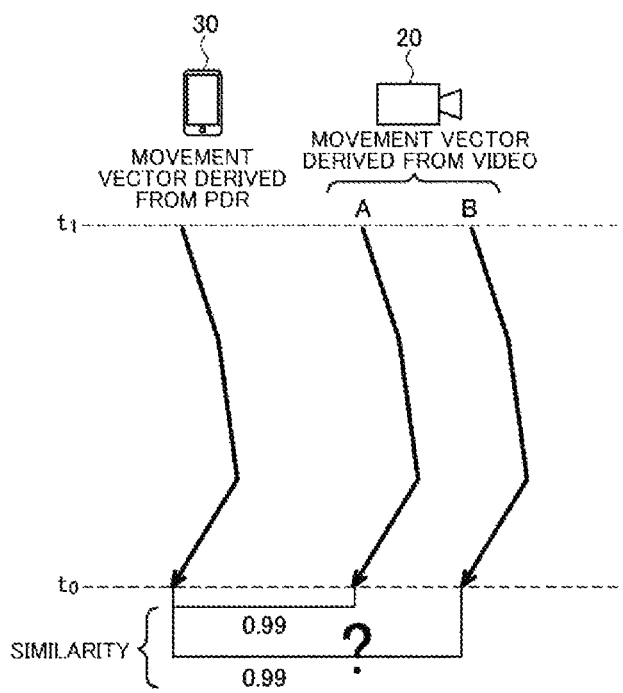
FIG. 3 is a diagram illustrating a case where a determination cannot be made by a movement vector check alone.

However, when a plurality of people move in the same direction at the same time within the angle of view of the environmental camera 20 as shown in FIG. 3, the calculated movement vectors A and B are almost the same and it may be difficult to determine a correct one by the check alone.

Therefore, the present disclosure performs a check of state information of the user in addition to the movement vector check to enable accurate determination. The check of state information is, for example, a walking step check, an activity information check, a mutual positional relationship check, or the like. Details will be described later.

The system according to the present disclosure realizes a positioning function that, even when there are a plurality of users within the same angle of view, can correctly associate individuals (individual user terminals) with the users. Using the present system, authentication information (for example, facial information, skeletal information (such as height and other features relating to the body structure), or clothing information) can be automatically registered and various services can be provided to the user.

An information processing system according to an embodiment of the present disclosure has been described above. Subsequently, an information processing system according to the present embodiment and the configuration of each device included in the information processing system will be described with reference to the drawings.

2. Exemplary Configurations

<2-1. Exemplary Configuration of System>

Figure 4:
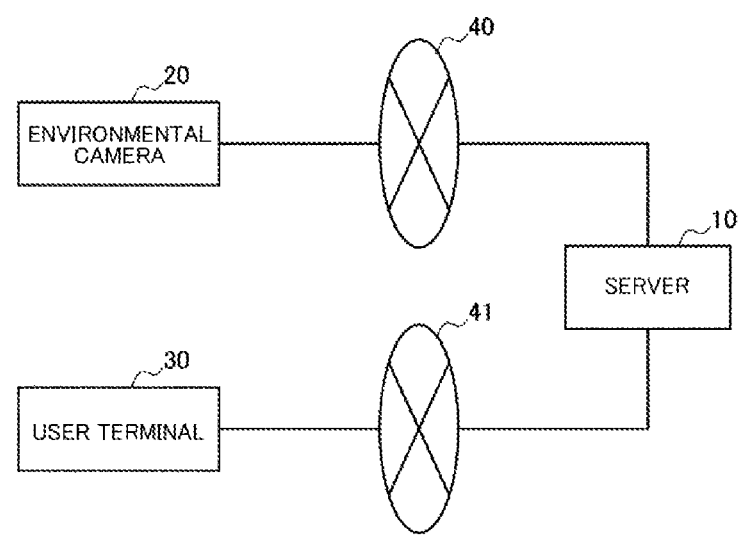
FIG. 4 is a diagram showing an example of a configuration of the information processing system according to the present embodiment.

FIG. 4 is a diagram showing an example of a configuration of the information processing system according to the present embodiment. As shown in FIG. 4, the information processing system according to the present embodiment includes an environmental camera 20, a user terminal 30, and a server 10. For example, a plurality of environmental cameras 20 are installed in a facility and their installation locations are known to the server 10. Each environmental camera 20 has a camera ID (an example of an identification character string for identifying the camera). The user terminal 30 is an information processing terminal carried by a user who visits the facility. The user terminal 30 may be, for example, a smartphone, a mobile phone terminal, a tablet terminal, or a wearable device worn on the user's body. The user may perform registration in the present system in advance using the user terminal 30 and thus the user ID may be known to the server 10. Registration in the present system may be performed by installing a predetermined application on the user terminal 30 or may be performed on a predetermined website.

The server 10 receives a camera ID and an analysis result of a captured image (such as a movement vector or state information of each person in the angle of view) from the environmental camera 20 via the network 40 (for example, a dedicated line in the facility). The server 10 also receives a user ID and an analysis result of sensing data (such as a movement vector or state information based on PDR) from the user terminal 30 via a network 41 (for example, Wi-Fi (registered trademark), Bluetooth (registered trademark), or an Internet line). The server 10 performs a movement vector check and a state information check and acquires a movement route of the user in the facility with high accuracy. Thus, the server 10 can perform promotion by notifying the user terminal 30 of appropriate information according to the position and activity of the user or by giving a coupon. The marketing effect can also be measured based on the movement route and activity of the user in the facility. The server 10 can also automatically register authentication information such as a facial image extracted from a captured image in association with the user ID. As a result, the server 10 can provide various services by facial authentication or the like in the facility. For example, when the user's credit card information has been registered in advance, it is possible to make a payment by facial authentication (without using the user terminal 30) in the facility.

The system configuration shown in FIG. 4 is an example and the present embodiment is not limited to this. For example, the server 10 may be composed of a plurality of devices. The network 40 and the network 41 may also be the same.

Subsequently, the configuration of each device included in the information processing system according to the present embodiment described above will be specifically described.

<2-2. Exemplary Configuration of Environmental Camera 20>

Figure 5:
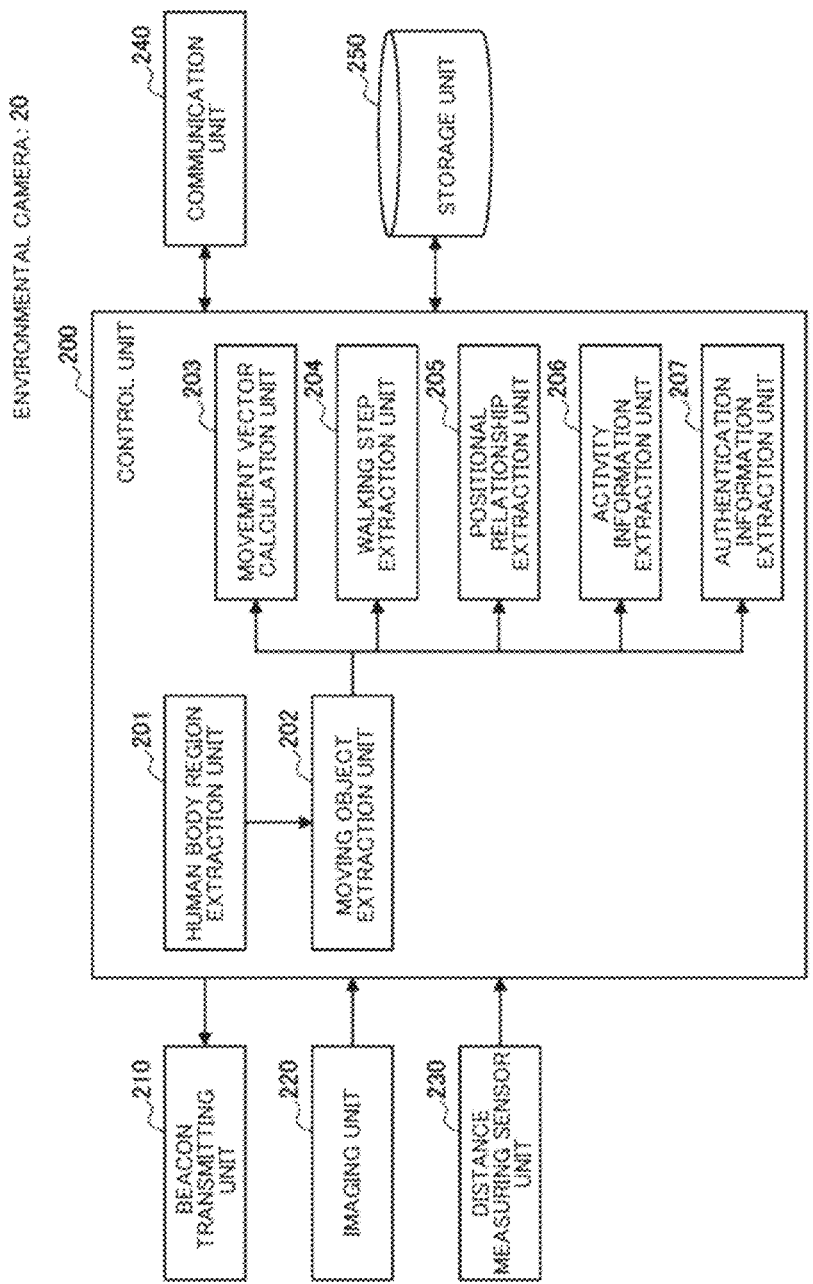
FIG. 5 is a block diagram showing an example of a configuration of an environmental camera according to the present embodiment.

FIG. 5 is a block diagram showing an example of a configuration of the environmental camera 20 according to the present embodiment. As shown in FIG. 5, the environmental camera 20 includes a control unit 200, a beacon transmitting unit 210, an imaging unit 220, a distance measuring unit 230, a communication unit 240, and a storage unit 250.

(Control Unit 200)

The control unit 200 functions as an arithmetic processing device and a control device and controls overall operations in the environmental camera 20 according to various programs. The control unit 200 is realized by an electronic circuit such as a central processing unit (CPU) or a microprocessor. The control unit 200 may include a read only memory (ROM) for storing programs to be used, calculation parameters, and the like and a random access memory (RAM) for temporarily storing parameters that change as appropriate and the like.

The control unit 200 according to the present embodiment also functions as a human body region extraction unit 201, a moving object extraction unit 202, a movement vector calculation unit 203, a walking step extraction unit 204, a positional relationship extraction unit 205, an activity information extraction unit 206, and an authentication information extraction unit 207.

The human body region extraction unit 201 extracts a region in which a human body is imaged from each captured image (each frame of a moving image) acquired from the imaging unit 220. Next, the moving object extraction unit 202 compares a plurality of frames, extracts a moving object based on the human body region data, and assigns a moving object number to the moving object. For example, the moving object extraction unit 202 compares frames arranged in time series based on facial and body feature points detected from the human body region, extracts a moving person (a moving object), and assigns a moving object number to the extracted moving person. Such moving object extraction can be performed for every video oft seconds. The t seconds may be, for example, a duration based on the transmission interval of a beacon which is periodically transmitted from the beacon transmitting unit 210. More specifically, the t seconds may be, for example, the same duration as the transmission interval, a duration which is half the transmission interval, or a duration including a plurality of transmission intervals.

The movement vector calculation unit 203 calculates a movement vector of each moving object based on the captured image. For example, the movement vector calculation unit 203 extracts changes in the position of each moving object in the video oft seconds and converts a trajectory connecting the changed positions into global coordinates to calculate the trajectory as a movement vector. The movement vector calculation unit 203 outputs movement vector information for each moving object number.

The walking step extraction unit 204 analyzes the timings of walking steps of each moving object (for example, the ground contact timing of the foot) in the video oft seconds. The walking step extraction unit 204 outputs walking step information for each moving object number.

The positional relationship extraction unit 205 analyzes a positional relationship (a mutual positional relationship) of a plurality of moving objects imaged in the captured image. The positional relationship extraction unit 205 may analyze the positional relationship of a plurality of moving objects by analyzing the captured image or may analyze the positional relationship of a plurality of moving objects with reference to distance information indicating distances between the moving objects and the environmental camera 20 which have been acquired by the distance measuring unit 230. The positional relationship extraction unit 205 may also analyze changes in the positional relationship in the video oft seconds. The positional relationship extraction unit 205 outputs mutual positional relationship information (with respect to nearby moving objects) for each moving object number.

The activity information extraction unit 206 extracts activity information of a plurality of moving objects imaged in the captured image (also referred to as activity recognition). The activity information extraction unit 206 analyzes the captured image to extract activities such as stationary, walking, running, using stairs, using an elevator, and using an escalator. Known techniques can be applied to the extraction of activity information. The activity information extraction unit 206 outputs the activity information for each moving object number.

The authentication information extraction unit 207 extracts information that can be used for user authentication (information that can identify the user from the appearance, which is referred to as authentication information in the present specification) from the captured image. For example, information such as a face, a body, a skeleton, clothes, or a walking gait can be extracted as authentication information. The authentication information may be featured. The authentication information extraction unit 207 outputs authentication information for each moving object number.

The control unit 200 performs control for transmitting the movement vector information, the walking step information, the mutual positional relationship information, and the activity information of each moving object number described above to the server 10 through the communication unit 240 together with the camera ID and the imaging time. The timing of transmission is not particularly limited. The control unit 200 may also transmit the captured image to the server 10.

(Beacon Transmitting Unit 210)

The beacon transmitting unit 210 has a function of transmitting a beacon which is an example of a signal for triggering the user terminal 30. Here, the beacon transmitting unit 210 transmits a Bluetooth low energy (BLE) beacon as an example. For example, the beacon transmitting unit 210 continuously transmits beacons at predetermined intervals, although the transmission timing of beacons is not particularly limited. It is desirable that beacons reach at least user terminals 30 located within the angle of view of the environmental camera 20.

(Imaging Unit 220)

The imaging unit 220 includes a lens system including an imaging lens, a diaphragm, a zoom lens, a focus lens, and the like, a drive system that causes the lens system to perform a focus operation and a zoom operation, a solid-state image sensor array that photoelectrically converts imaging light obtained through the lens system to generate an imaging signal, and the like. The solid-state image sensor array may be realized, for example, by a charge coupled device (CCD) sensor array or a complementary metal oxide semiconductor (CMOS) sensor array.

(Distance Measuring Unit 230)

The distance measuring unit 230 has a function of acquiring distance information indicating the distance to the user terminal 30. The distance measuring method may be, for example, distance measurement using Bluetooth RSSI or distance measurement using an ultra-wide band (UWB), although the distance measuring method is not particularly limited. The distance measuring unit 230 may calculate the distance or may receive distance information calculated by the user terminal 30. The distance measuring unit 230 may also be a depth sensor or the like that can acquire the distance to the moving object (the user).

(Communication Unit 240)

The communication unit 240 is a communication module for transmitting and receiving data to and from other devices. For example, the communication unit 240 connects to the server 10 via the network 40 to transmit and receive data.

(Storage Unit 250)

The storage unit 250 stores a program or the like for causing the control unit 200 to execute various processes. The storage unit 250 includes a storage device including a storage medium, a recording device for recording data on the storage medium, a reading device for reading data from the storage medium, a deletion device for deleting data recorded on the storage medium, and the like. The storage unit 250 may be realized by a read only memory (ROM) that stores programs, calculation parameters, and the like used for processing of the control unit 200 and a random access memory (RAM) that temporarily stores parameters that change as appropriate.

The configuration of the environmental camera 20 according to the present embodiment has been specifically described above. The configuration of the environmental camera 20 according to the present embodiment is not limited to the example shown in FIG. 5. For example, the environmental camera 20 may not include the distance measuring unit 230. The environmental camera 20 may also be configured to include at least one of the walking step extraction unit 204, the positional relationship extraction unit 205, and the activity information extraction unit 206.

At least one of the various processes performed by the control unit 200 of the environmental camera 20 may be performed by the server 10. For example, the control unit 200 may perform processing up to that of the moving object extraction unit 202 and transmit the processing result and the captured image to the server 10 and the server 10 may perform the processing of the movement vector calculation unit 203, the walking step extraction unit 204, the positional relationship extraction unit 205, the activity information extraction unit 206, and the authentication information extraction unit 207.

<2-3. Exemplary Configuration of User Terminal 30>

Figure 6:
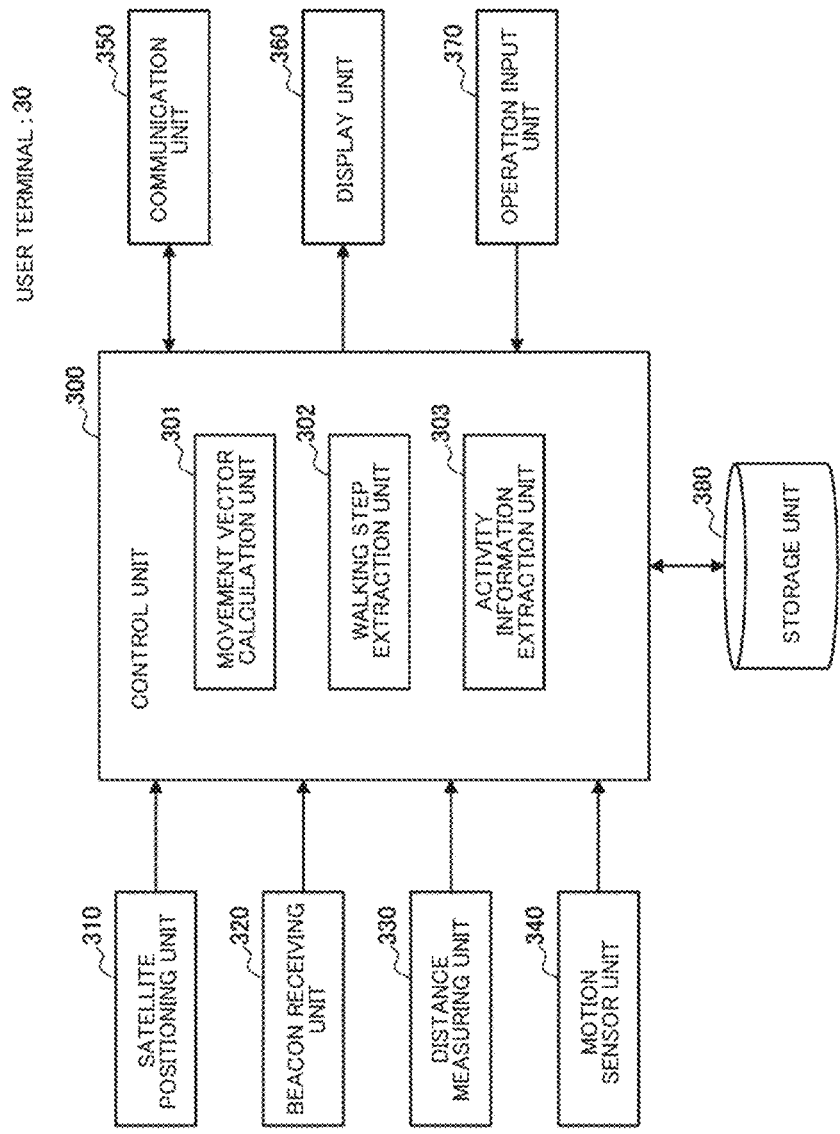
FIG. 6 is a block diagram showing an example of a configuration of a user terminal according to the present embodiment.

FIG. 6 is a block diagram showing an example of a configuration of the user terminal 30 according to the present embodiment. As shown in FIG. 6, the user terminal 30 includes a control unit 300, a satellite positioning unit 310, a beacon receiving unit 320, a distance measuring unit 330, a motion sensor unit 340, a communication unit 350, a display unit 360, an operation input unit 370, and a storage unit 380.

(Control Unit 300)

The control unit 300 functions as an arithmetic processing device and a control device and controls overall operations in the user terminal 30 according to various programs. The control unit 300 is realized by an electronic circuit such as a central processing unit (CPU) or a microprocessor. The control unit 300 may include a read only memory (ROM) for storing programs to be used, calculation parameters, and the like and a random access memory (RAM) for temporarily storing parameters that change as appropriate and the like.

The control unit 300 according to the present embodiment also functions as a movement vector calculation unit 301, a walking step extraction unit 302, and an activity information extraction unit 303.

The movement vector calculation unit 301 calculates a movement vector of the user (the person carrying the user terminal 30) based on sensing data of the motion sensor unit 340. More specifically, the movement vector calculation unit 301 may calculate a movement vector through PDR (an example of indoor positioning) that estimates a movement trajectory from the number of steps, the stride length, and the traveling direction based on acceleration, angular velocity, and magnetism data obtained by the motion sensor unit 340.

The walking step extraction unit 302 extracts the timings of walking steps of the user (the person carrying the user terminal 30) based on sensing data of the motion sensor unit 340. The timings of walking steps are the times when the foot contacts the ground, and for example, the walking cycle may be acquired from acceleration of three axes obtained by the motion sensor unit 340 and the maximum value of the acceleration in each walking cycle may be detected as the ground contact timing. Details will be described later.

The activity information extraction unit 303 extracts an activity of the user (the person carrying the user terminal 30) such as stationary, walking, running, using stairs, using an elevator, and using an escalator based on sensing data of the motion sensor unit 340. For example, the activity information extraction unit 303 can recognize the activity of the user based on the acceleration, angular velocity, magnetism, atmospheric pressure, or the like obtained by the motion sensor unit 340. Known techniques can be applied to the activity recognition algorithm.

The control unit 300 performs control for, upon determining that the user has entered a target facility from position information acquired from the satellite positioning unit 310, continuously performing the movement vector calculation, the walking step extraction, and the activity information extraction described above and transmitting the calculated and extracted data to the server 10. Such control may be performed by an application that has been installed in the user terminal 30 in advance in order to use the present system. The position information of the target facility, the content of data to be transmitted, and the like may be stored in the storage unit 380.

(Satellite Positioning Unit 310)

The satellite positioning unit 310 receives global positioning system (GPS) and other global navigation satellite system (GNSS) signals and detects a position where the user terminal 30 is present based on the received signals. The satellite positioning unit 310 is an example of an outdoor positioning unit. The position may be detected, for example, using Wi-Fi, Bluetooth, or the like in addition to GNSS. The satellite positioning unit 310 outputs the detected position information to the control unit 300. The control unit 300 can determine that the user has entered the target facility based on such position information.

(Beacon Receiving Unit 320)

The beacon receiving unit 320 has a function of receiving a beacon transmitted from the user terminal 30. Such a beacon is an example of a signal that triggers the control unit 300 to start a predetermined control. A time interval at which a check is to be performed by the server 10 that will be described later is specified by receiving such a beacon. A beacon may include the camera ID (for example, a MAC address) of the environmental camera 20 that has transmitted the beacon. For example, the control unit 300 may perform control for, in response to receiving a beacon, acquiring data on a distance to the environmental camera 20 and distances to other user terminals present in the vicinity through the distance measuring unit 330 and transmitting the acquired data to the server 10 together with the camera ID included in the received beacon, the reception time of the beacon, and the user ID. The control unit 300 may also perform control for, when reception of the beacon is lost, transmitting distance information that has been (continuously) acquired during reception of the beacon to the server 10 together with the reception start and end times of the beacon, the camera ID, and the user ID. In performing control for acquiring and transmitting distance information in response to receiving a beacon, the control unit 300 also continuously performs movement vector calculation, walking step extraction, and activity information extraction in the facility and transmits the calculated and extracted information to the server 10 together with the time information and the user ID.

(Distance Measuring Unit 330)

The distance measuring unit 330 measures the distance between the environmental camera 20 and the user terminal 30 and the distances between the user terminal 30 and other user terminals located in the vicinity of the user terminal 30. The distance measuring method may be, for example, distance measurement using Bluetooth RSSI or distance measurement using an ultra-wide band (UWB), although the distance measuring method is not particularly limited. The distance measuring unit 330 may calculate the distance between the environmental camera 20 and the user terminal 30 or may receive distance information calculated by the environmental camera 20. Based on such distance information between the environmental camera 20 and other user terminals, the server 10 can determine the mutual positional relationship between the user and the environmental camera 20 or between the user and other users.

(Motion Sensor Unit 340)

The motion sensor unit 340 is a sensor for capturing the movement of a person. For example, the motion sensor unit 340 includes an acceleration sensor, an angular velocity sensor, a geomagnetic sensor, a barometric pressure sensor, and the like. The motion sensor unit 340 may also include a sensor capable of detecting a total of 9 axes, composed of a 3-axis gyro sensor, a 3-axis acceleration sensor, and a 3-axis geomagnetic sensor. The motion sensor unit 340 outputs data (sensing data) detected by each sensor to the control unit 300.

(Communication Unit 350)

The communication unit 350 is a wireless communication module for transmitting and receiving data to and from other devices. For example, the communication unit 350 wirelessly connects to the network 41 and transmits and receives data to and from the server 10 via the network 41. The wireless communication method may arbitrarily use a communication scheme such as, for example, a wireless local area network (LAN), Bluetooth (registered trademark), Wi-Fi (registered trademark), long term evolution (LTE), a 3rd generation mobile communication method (3G), a 4th generation mobile communication method (4G), and a 5th generation mobile communication method (5G), although the wireless communication method is not particularly limited.

(Display Unit 360)

The display unit 360 has a function of displaying various operation screens, notification screens, and the like. The display unit 360 is realized by a display device such as a liquid crystal display (LCD) or an organic electro-luminescence (EL) display. When the user terminal 30 is a head mounted display (HMD), the display unit 360 may be a transmissive display. The display unit 360 may be a laser scanning type display such as a direct retinal scan display. The display unit 360 may include an imaging optical system that magnifies and projects the display screen to form an enlarged virtual image having a predetermined angle of view in the user's pupil.

The display unit 360 can display the content of a notification (such as an authentication information registration or deletion notification), coupon information, product information, advertisement, and the like that the user terminal 30 has received from the server 10. Information provision from the facility that the user entered can be performed by the server 10.

(Operation Input Unit 370)

The operation input unit 370 receives an operation instruction from the user and outputs the content of the operation to the control unit 300. The operation input unit 370 may be, for example, a button, a switch, or a touch sensor. The operation input unit 370 may also detect the user's voice, movement, gesture, or the like to receive an operation instruction.

(Storage Unit 380)

The storage unit 380 stores a program or the like for causing the control unit 300 to execute various processes. The storage unit 380 includes a storage device including a storage medium, a recording device for recording data on the storage medium, a reading device for reading data from the storage medium, a deletion device for deleting data recorded on the storage medium, and the like. The storage unit 380 may be realized by a read only memory (ROM) that stores programs, calculation parameters, and the like used for processing of the control unit 300 and a random access memory (RAM) that temporarily stores parameters that change as appropriate.

The configuration of the user terminal 30 according to the present embodiment has been specifically described above. The configuration of the user terminal 30 according to the present embodiment is not limited to the example shown in FIG. 5. For example, the user terminal 30 may be configured to include at least one of the walking step extraction unit 302 and the activity information extraction unit 303.

At least one of the various processes performed by the control unit 300 of the user terminal 30 may be performed by the server 10. For example, the control unit 300 may transmit data (sensing data) detected by the motion sensor unit 340 to the server 10 together with the detection time and the server 10 may perform the processing of the movement vector calculation unit 301, the walking step extraction unit 302, and the activity information extraction unit 303.

The user terminal 30 may further include sensors such as a camera, an infrared sensor, biological sensors (involving the pulse, heartbeat, sweating, blood pressure, body temperature, respiration, myoelectric values, or brain waves), and a microphone. For example, the activity information extraction unit 303 may extract activity information (recognize an activity), also using sensing data from these sensors.

The user terminal 30 may be realized by a plurality of devices. For example, the user terminal 30 may be configured to include a display device (corresponding to at least the display unit 360) realized by an HMD or the like and an information processing terminal (corresponding to at least the control unit 300) realized by a smartphone, a tablet terminal, a wearable device, or the like.

Although the display unit 360 has been described as an example of an information presentation unit, the present embodiment is not limited to this and various notifications to the user (such as authentication information registration and deletion notifications, a notification of profitable information such as coupons that can be used at the facility, or an advertisement of facilities) may be provided by audio output from an audio output unit (not shown). The audio output unit may be provided in the user terminal 30 or may be configured separately from the user terminal 30. Audio may also be output from a speaker provided in the facility. The speaker provided in the facility may be a directional speaker. When the speaker is a directional speaker, it can output audio toward the position of the user to notify the user of predetermined information.

Information presentation may also be performed by combining display output and audio output. Notifications such as a notification of whether authentication information has been registered and a notification of deletion of the authentication information may be provided by a light emitting unit or a vibration unit provided in the user terminal 30. Various notifications can also be provided using an emission color or an emission pattern (such as blinking) of the light emitting unit, a vibration pattern, or the like.

<2-4. Exemplary Configuration of Server 10>

Figure 7:
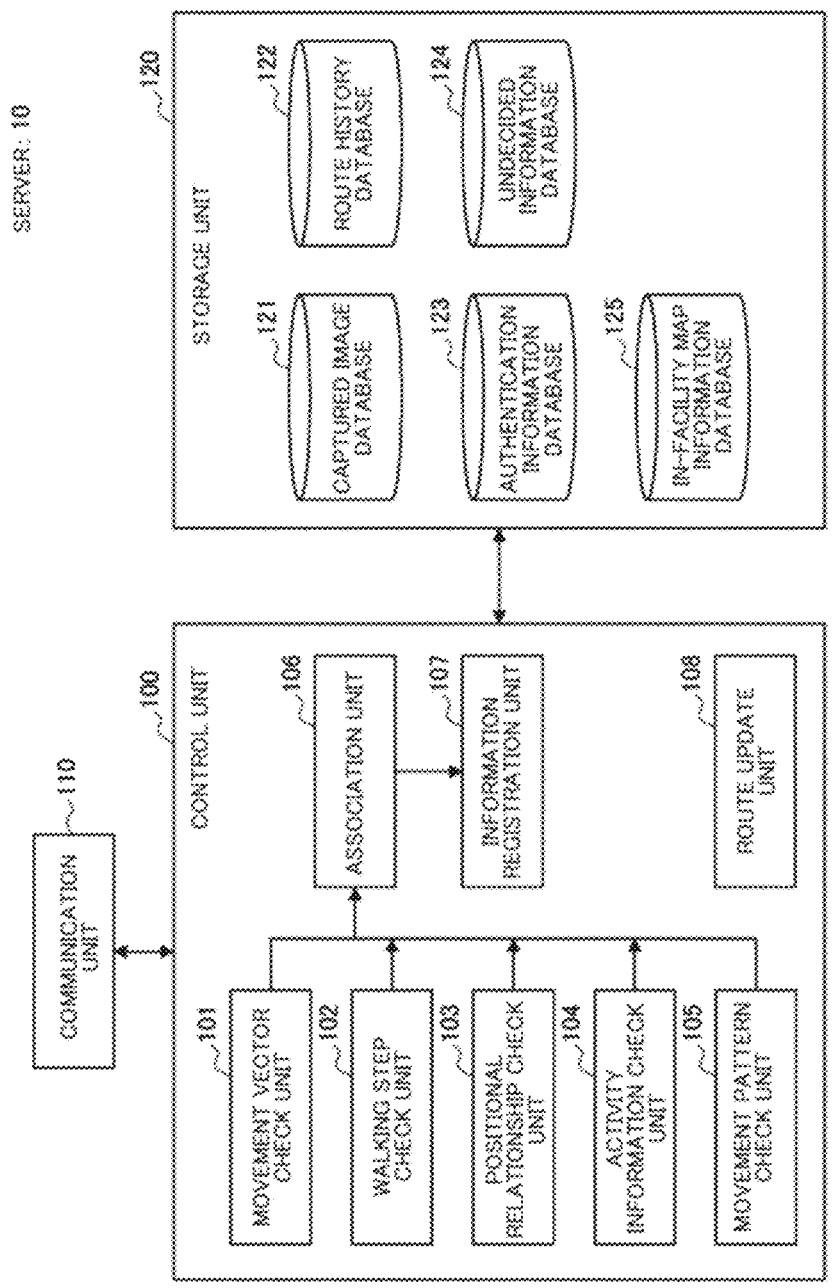
FIG. 7 is a block diagram showing an example of a configuration of a server according to the present embodiment.

FIG. 7 is a block diagram showing an example of a configuration of the server 10 according to the present embodiment. As shown in FIG. 7, the server 10 includes a control unit 100, a communication unit 110, and a storage unit 120.

The control unit 100 functions as an arithmetic processing device and a control device and controls overall operations in the server 10 according to various programs. The control unit 100 is realized by an electronic circuit such as a central processing unit (CPU) or a microprocessor. The control unit 100 may include a read only memory (ROM) for storing programs to be used, calculation parameters, and the like and a random access memory (RAM) for temporarily storing parameters that change as appropriate and the like.

The control unit 100 stores pieces of data that have been received from the environmental camera 20 and the user terminal 30 through the communication unit 110 in the storage unit 120. Specifically, the control unit 100 performs control for storing information received from the environmental camera 20 (a camera ID, time information, a captured image (video), and various information obtained by analyzing the captured image (such as a movement vector, walking steps, activity information, a mutual positional relationship, and authentication information of each moving object imaged in the image)) in a captured image database (DB) 121. The control unit 100 also performs control for storing information received from the user terminal 30 (such as a user ID, time information, movement vector information (for example, PDR position information), walking step information, and activity information) in a route history database 122.

The control unit 100 also functions as a movement vector check unit 101, a walking step check unit 102, a positional relationship check unit 103, an activity information check unit 104, a movement pattern check unit 105, an association unit 106, an information registration unit 107, and a route update unit 108.

The movement vector check unit 101 checks a movement vector obtained from the user terminal 30 with movement vectors of moving objects obtained from the environmental camera 20. Specifically, the movement vector check unit 101 checks a movement vector of the user terminal 30 for the time during which the user terminal 30 receives a beacon from the environmental camera 20 (for example, for t seconds from the start to the end of the reception) with a movement vector of each moving object acquired from an image captured at that time by the environmental camera 20 that has transmitted the beacon. In the movement vector check, the movement vector check unit 101 may calculate the degrees of similarity of the movement vectors of the moving objects to the movement vector of the user terminal 30 to determine the most similar movement vector as described with reference to FIG. 2. It can be said that a moving object showing the most similar movement vector is the user who carries the user terminal 30.

The walking step check unit 102 checks walking steps obtained from the user terminal 30 with walking steps of moving objects obtained from the environmental camera 20. Specifically, the walking step check unit 102 checks walking steps of the user terminal 30 for the time during which the user terminal 30 receives a beacon from the environmental camera 20 (for example, for t seconds from the start to the end of the reception) with walking steps of each moving object acquired from an image captured at that time by the environmental camera 20 that has transmitted the beacon. Details of the walking step check process will be described later. A walking step is an example of "state information" in the present embodiment. It is difficult to identify the user by the movement vector check alone when a plurality of moving objects (people) move in the same direction at the same time within the same angle of view as described with reference to FIG. 3. Therefore, in the present embodiment, the user is identified taking into account not only the movement vector check but also the check of state information (for example, walking steps), thus increasing the accuracy of identification.

The positional relationship check unit 103 checks a positional relationship obtained from the user terminal 30 (a mutual positional relationship with respect to the environmental camera 20 or other nearby user terminals) with positional relationships of moving objects obtained from the environmental camera 20 (distances to the moving objects or mutual positional relationships between each moving object and its nearby moving objects). A mutual positional relationship may include position information (for example, global coordinates) or distance information. More specifically, the positional relationship check unit 103 checks a positional relationship of the user terminal 30 for the time during which the user terminal 30 receives a beacon from the environmental camera 20 (for example, for t seconds from the start to the end of the reception) with a positional relationship of each moving object acquired from an image captured at that time by the environmental camera 20 that has transmitted the beacon. Details of the positional relationship check process will be described later. A positional relationship is an example of "state information" in the present embodiment. It is difficult to identify the user by the movement vector check alone when a plurality of moving objects (people) move in the same direction at the same time within the same angle of view as described with reference to FIG. 3. Therefore, in the present embodiment, the user is identified taking into account not only the movement vector check but also the check of state information (for example, a positional relationship), thus increasing the accuracy of identification.

The activity information check unit 104 checks activity information obtained from the user terminal 30 with activity information of moving objects obtained from the environmental camera 20. Specifically, the walking step check unit 102 checks activity information of the user terminal 30 for the time during which the user terminal 30 receives a beacon from the environmental camera 20 (for example, for t seconds from the start to the end of the reception) with activity information of each moving object acquired from an image captured at that time by the environmental camera 20 that has transmitted the beacon. Details of the activity information check process will be described later. Activity information is an example of "state information" in the present embodiment. It is difficult to identify the user by the movement vector check alone when a plurality of moving objects (people) move in the same direction at the same time within the same angle of view as described with reference to FIG. 3. Therefore, in the present embodiment, the user is identified taking into account not only the movement vector check but also the check of state information (for example, activity information), thus increasing the accuracy of identification.

The movement pattern check unit 105 checks a movement pattern of the user based on information obtained from the user terminal 30 with movement patterns of moving objects based on information (combined information) obtained from a plurality of environmental cameras 20. A movement pattern is, for example, a movement pattern that agrees with a preset rule (such as a route that has been set using map information in the facility).

The movement pattern check unit 105 combines a movement vector of the user terminal 30 for the time during which the user terminal 30 receives a beacon from a first environmental camera (for example, for t seconds from the start to the end of the reception) with a movement vector for the time during which the user terminal 30 receives a beacon from a second environmental camera adjacent to (or located closed to) the first environmental camera (for example, for t seconds from the start to the end of the reception) to extract a movement pattern. The movement pattern check unit 105 also combines movement vectors of each moving object acquired from images captured by first and second adjacent environmental cameras to extract a movement pattern of each moving object. For example, appearance features such as facial information, skeleton information, clothing information, or walking gait information of each moving object are used to identify each moving object (search for the same person) whose movement pattern is to be extracted from images captured by the first and second adjacent environmental cameras.

Details of the movement pattern check process will be described later. A movement pattern is an example of "state information" in the present embodiment. It is difficult to identify the user by the movement vector check alone when a plurality of moving objects (people) move in the same direction at the same time within the same angle of view as described with reference to FIG. 3. Therefore, in the present embodiment, the user is identified taking into account not only the movement vector check but also the check of state information (for example, a movement pattern), thus increasing the accuracy of identification.

Based on the above check results, the association unit 106 associates the user who possesses the user terminal 30 with a person (a moving object) imaged in the captured image acquired by the environmental camera 20. For example, the association unit 106 may calculate a check confidence score indicating the reliability of each check and associate the user with reference to the calculated check confidence score. Specifically, the association unit 106 sums the check confidence scores for each moving object, determines that a moving object with the maximum sum is the user, and associates the moving object with the user.

The association unit 106 may associate the user based on at least one of the check results or may perform the user based on at least two or more of the check results. For example, the association unit 106 may associate the user based on the movement vector check and the check of state information (for example, at least one of walking steps, a positional relationship, activity information, and a movement pattern). The state information includes information that can be recognized from the outside (that is, information that can be observed from the outside such as, for example, a movement and a position). The state information can be extracted from various sensing data of the user terminal 20. The state information can also be extracted from a captured image of the environmental camera 20 through image analysis. In the present embodiment, walking steps, a positional relationship (such as coordinate positions or distance information), activity information, and a movement pattern are used as examples of state information, but the state information according to the present disclosure is not limited to these. When the user cannot be identified (a target moving object cannot be identified) by the movement vector check alone, the association unit 106 may associate the user based on the check of at least one piece of state information. The association unit 106 may also combine the check results and identify a moving object which matches the most in the checks (which is the most successful in the checks) as the user.

The information registration unit 107 registers authentication information (such as facial information) of the person (the moving object) associated with the user in an authentication information database 123 as authentication information of the user. Specifically, the information registration unit 107 registers the user ID and the authentication information. It is assumed that the registered authentication information is authentication information acquired by the environmental camera 20 with which a check is successful. When authentication information cannot be acquired by the environmental camera 20 with which a check is successful due to occlusion or the like, the information registration unit 107 may estimate an environmental camera 20 that the user has passed by in the past from data on the user ID in the route history database 122 and register authentication information acquired by that environmental camera 20. Similarly, for a user with whom a check is successful at a certain time, the information registration unit 107 may register authentication information acquired from video of an environmental camera 20 that the user has passed by after that time. The information registration unit 107 may notify the user terminal 30 that the authentication information has been registered.

A camera dedicated to acquiring authentication information and an environmental camera for checking movement vectors or the like may be separated from each other. A camera dedicated to acquiring authentication information may be installed in the same place as an environmental camera for checking or may be installed in at least one place (for example, the entrance of the facility) where more faces of visitors can be photographed. For example, authentication information can be acquired upon entry into the hall and thereafter the authentication information acquired upon the entry can be registered in association with the user ID when a check using a movement vector or the like is completed. A camera for acquiring authentication information can differ from an environmental camera for movement vector check in terms of performance specifications and is, for example, a camera with a narrow angle of view or a high-magnification, high-resolution camera. For example, a time period in which a user has passed near a camera dedicated to acquiring authentication information is identified from a route history of a user ID with which a check is successful or the time period in which the user has passed is identified based on a time period in which a beacon has been received from the camera dedicated to acquiring authentication information and authentication information (more accurate authentication information) acquired from the camera dedicated to acquiring authentication information during that time period may be registered in the authentication information database 123. When a plurality of pieces of authentication information have been acquired from the camera dedicated to acquiring authentication information during the time period in which the user has passed, they may be checked for matching with authentication information of the user acquired from a camera for checking to obtain a correct piece of authentication information.

A camera dedicated to acquiring authentication information may also be provided in a drone that can accurately measure the position using an UWB or the like. The drone flies in the hall to photograph visitors.

On the other hand, when a check is not so successful, the information registration unit 107 registers a user ID and a camera ID with which the check is not so successful (that is, an association cannot be made) in an undecided information database 124.

The information registration unit 107 may update authentication information stored in the authentication information database 123 based on latest data. The information registration unit 107 may also increase authentication information stored in the authentication information database 123 based on latest data.

The route update unit 108 updates data through a process of combining a past movement route of the user stored in the route history database 122 and a newly acquired movement route and a position correction process after the user has been associated. Pieces of PDR position information (that is, movement vectors) are continuously transmitted to the server 10 from the user terminal 30 of the user who has entered the facility as described above. The route update unit 108 combines the acquired pieces of PDR position information to generate a movement route of the user in the facility. PDR may accumulate errors with the passage of time due to its characteristics of calculation of relative movement vectors as described above. Therefore, in the present embodiment, when the association unit 106 has identified (associated) the user, the route update unit 108 corrects the movement route stored in the route history database 122 based on a movement vector obtained from the environmental camera 20 (a movement vector of a moving object that has been associated with the user). This makes it possible to generate a more accurate movement route.

After user authentication information (such as facial information) is automatically registered, the route update unit 108 can identify the user from a captured image obtained from the environmental camera 20 based on the authentication information and then correct the movement route of the user.

The control unit 100 according to the present embodiment can further perform control for notifying the user of various information from the facility. For example, the control unit 100 can perform control for transmitting appropriate information to the user terminal 30 through the communication unit 110 according to the movement route or activity of the user. Information may be transmitted to a terminal address registered in advance.

(Communication Unit 110)

The communication unit 110 is a communication module for transmitting and receiving data to and from other devices. For example, the communication unit 110 connects to one or more environmental cameras 20 (cameras installed in places in the facility) via the network 40 to transmit and receive data. The communication unit 110 also connects to one or more user terminals 30 (user terminals carried by users moving in the facility) via the network 41 to transmit and receive data.

(Storage Unit 120)

The storage unit 120 stores a program or the like for causing the control unit 100 to execute various processes. The storage unit 120 includes a storage device including a storage medium, a recording device for recording data on the storage medium, a reading device for reading data from the storage medium, a deletion device for deleting data recorded on the storage medium, and the like. The storage unit 120 may be realized by a read only memory (ROM) that stores programs, calculation parameters, and the like used for processing of the control unit 100 and a random access memory (RAM) that temporarily stores parameters that change as appropriate.

The storage unit 120 according to the present embodiment stores the captured image database 121, the route history database 122, the authentication information database 123, the undecided information database 124, and an in-facility map information database 125. The captured image database 121 stores data (such as a camera ID, time information, captured images, movement vector information, walking step information, activity information, or authentication information) obtained from each environmental camera 20. The route history database 122 stores data (such as a user ID, time information, movement vector information, walking step information, activity information, distance information, or received camera IDs) obtained from the user terminal 30. The authentication information database 123 stores the user ID and the authentication information in association with each other. The undecided information database 124 stores the user ID and the camera ID for which a check is not successful. The in-facility map information database 125 stores in-facility map information. The map information may include installation location information of each environmental camera 20.

The configuration of the server 10 according to the present embodiment has been specifically described above. The configuration of the server 10 according to the present embodiment is not limited to the example shown in FIG. 7. For example, the server 10 may be realized by a plurality of devices.

The server 10 may also have the functions of the control unit 200 of the environmental camera 20 and the functions of the control unit 300 of the user terminal 30.

3. Operation Process

Subsequently, operation processes according to the present embodiment will be specifically described.

<3-1. Operation Process of Information Processing System>

Figure 8:
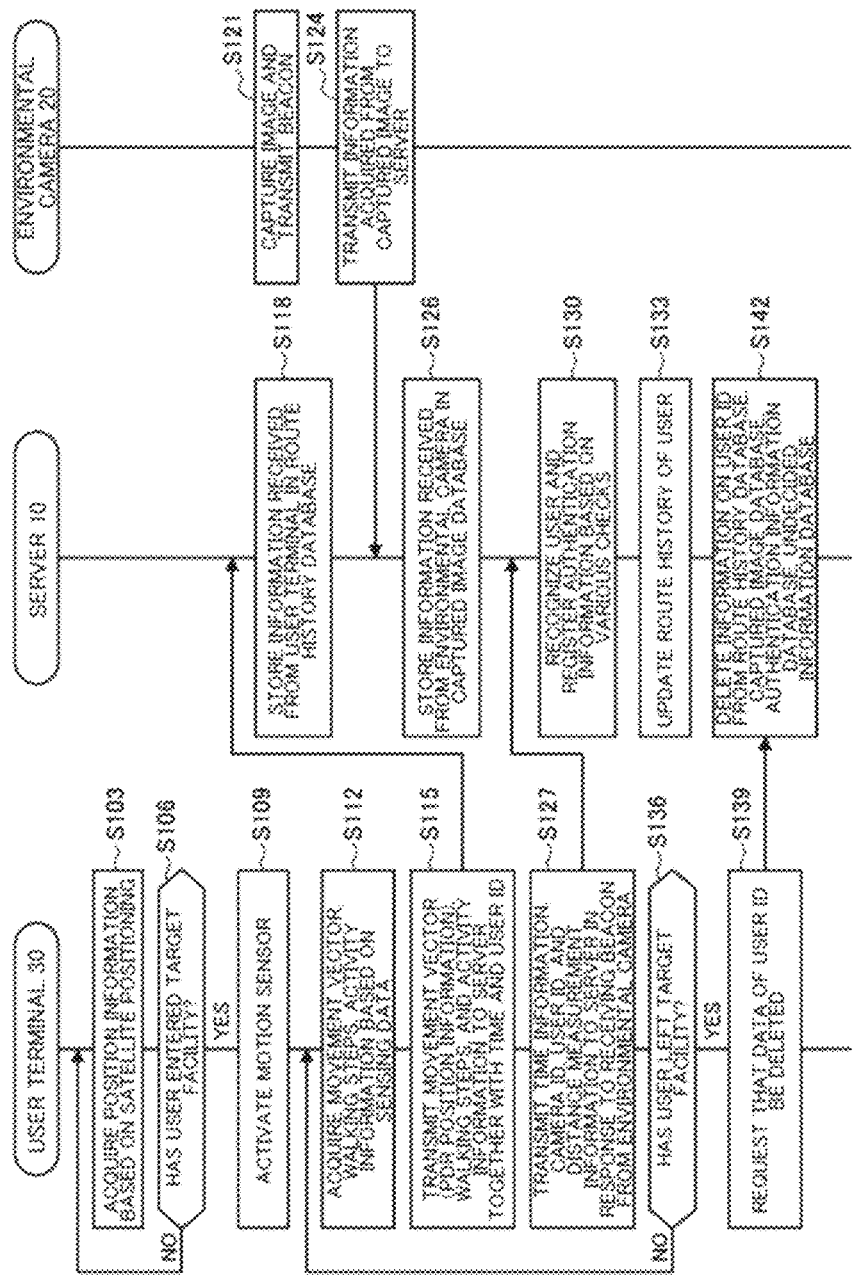
FIG. 8 is a sequence diagram showing an example of a flow of an operation process of the information processing system according to the present embodiment.

FIG. 8 is a sequence diagram showing an example of a flow of an operation process of the information processing system according to the present embodiment.

As shown in FIG. 8, first, the user terminal 30 acquires position information based on satellite positioning from the satellite positioning unit 310 (step S103).

Next, upon determining that the user has entered a target facility based on the position information (Yes in step S106), the control unit 300 activates the motion sensor unit 340 (step S109). The location information of the target facility can be stored in the storage unit 380 in advance. Such activation triggering of the motion sensor unit 340 is an example and it can also be assumed that the motion sensor unit 340 has already been activated. The control unit 300 may activate the motion sensor unit 340 in response to a signal (such as a BLE beacon) received from a device installed at the entrance of the target facility or the like.

Next, the control unit 300 performs calculation of a movement vector and extraction of walking steps and activity information based on sensing data obtained from the motion sensor unit 340 (step S112). The calculation of a movement vector and the extraction of walking steps and activity information can be continuously performed while moving in the facility.

Next, the control unit 300 performs control for transmitting the movement vector (PDR position information), the walking steps, and the activity information to the server 10 together with the acquisition time and the user ID (step S115). The timings of transmission to the server 10 may be, for example, at regular time intervals although the timings of transmission to the server 10 are not particularly limited.

Next, the server 10 stores the information received from the user terminal 30 in the route history database 122 (step S118).

On the other hand, each of the one or more environmental cameras 20 arranged in the facility performs control for continuously capturing an image of the surroundings and periodically transmitting a predetermined beacon (step S121).

Next, the environmental camera 20 transmits information acquired from the captured image to the server 10 (step S124). Specifically, the environmental camera 20 performs control for transmitting a movement vector, walking steps, a positional relationship, activity information, or the like and authentication information of each moving object acquired from the captured image to the server 10 together with the captured image, time information, a camera ID, and the like.

Next, the server 10 stores information received from the environmental camera in the captured image database 121 (step S126).

Subsequently, the user terminal 30 performs control for, in response to receiving a beacon from the environmental camera 20, transmitting time information indicating a time period in which the beacon has been received (for example, the reception start and end times of the beacon, where the beacon may be lost when away from the environmental camera 20 since the user is moving), the user ID, distance measurement information, and the camera ID included in the beacon to the server 10 (step S127). The distance measurement information is information that the user terminal 30 has acquired through the distance measuring unit 330 triggered by receiving a beacon from the environmental camera 20. The distance measurement information is, for example, distance information between the user terminal 30 and the environmental camera 20 and distance information between the user terminal 30 and other user terminals located in the vicinity.

Next, the control unit 100 of the server 10 performs various checks based on the information received from the environmental camera 20 and the information received from the user terminal 30 and identifies (associates) the user and registers authentication information (of the associated user) in the authentication information database 123 (step S130). The server 10 can perform user authentication in the facility using the authentication information. The server 10 can also provide various services such as payment processing through user authentication. The device that performs such service provision and user authentication may be an information processing device or system different from the server 10.

Next, the information registration unit 107 corrects and updates the route history (a movement route history) stored in the route history database 122 of the user based on the movement vector of the user acquired from the captured image of the environmental camera 20 (step S133). This corrects the error of the movement route based on PDR and increases the accuracy of the movement route. The server 10 can provide appropriate information to the user based on the user's position, movement route, predetermined activity at a predetermined place, or the like in the facility.

Then, upon detecting that the user has left the target facility (Yes in step S136), the user terminal 30 requests the server 10 to delete data associated with the user ID of the user (step S139). It may be determined that the user has left the target facility, for example, based on a signal (such as a BLE beacon) received from a device provided at the exit of the facility or based on position information acquired by the satellite positioning unit 310.

Upon receiving the request, the server 10 deletes all information associated with the user ID from the captured image database 121, the route history database 122, the authentication information database 123, and the undecided information database 124 (step S142). For example, when approved by the user, the server 10 can delete the association with the user ID from the route history database 122 and leave the movement route information as a history and use it for measuring the marketing effect or the like while maintaining anonymity.

Here, a process in the user terminal 30 of automatically requesting that data associated with the user ID be deleted when the user has left the target facility has been described as an example, but the present embodiment is not limited to this. For example, the user may manually make a deletion request using the user terminal 30.

An example of the overall process of the information processing system according to the present embodiment has been described above. Subsequently, each operation process of the information processing system according to the present embodiment will be specifically described in order.

<3-2. Operation Process of Environmental Camera 20>

Figure 9:
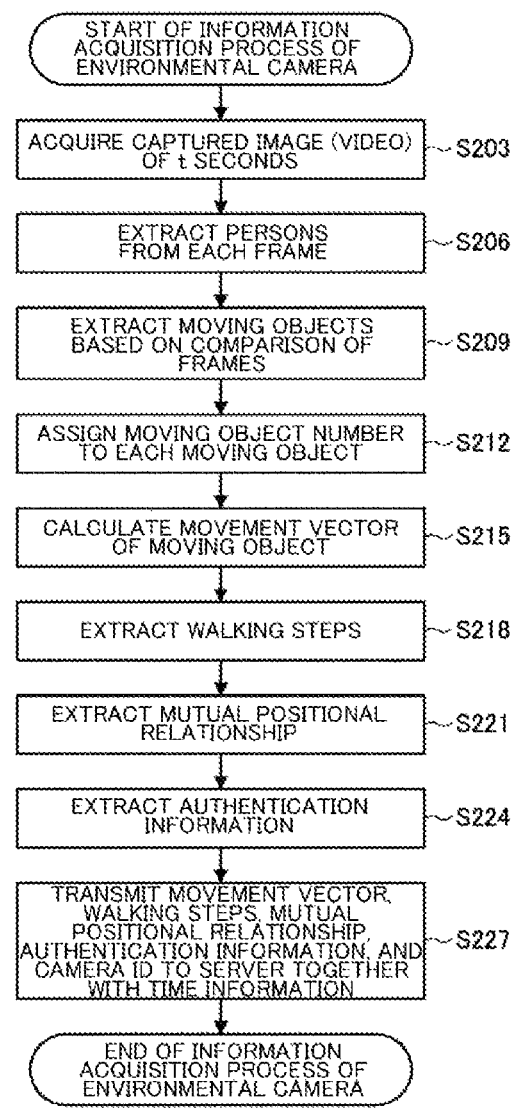
FIG. 9 is a flowchart showing an example of a flow of an operation process of the environmental camera according to the present embodiment.

FIG. 9 is a flowchart showing an example of a flow of an operation process of the environmental camera 20 according to the present embodiment. As shown in FIG. 9, first, the control unit 200 of the environmental camera 20 acquires an image (video) for t seconds captured by the imaging unit 220 (step S203). The captured video may be stored in the storage unit 250 and appropriately extracted by the control unit 200.

Next, the human body region extraction unit 201 extracts persons (human body regions) from each frame (each still image included in the video of t seconds) (step S206).

Next, the moving object extraction unit 202 extracts a moving object based on the comparison of frames (step S209). Specifically, the moving object extraction unit 202 compares frames arranged in a time series, recognizes the movement of an extracted person, and extracts it as a moving object.

Next, the moving object extraction unit 202 assigns a moving object number to the extracted moving object (step S212).

Next, the movement vector calculation unit 203 calculates a movement vector of each moving object based on the captured image (step S215).

Next, the walking step extraction unit 204 extracts walking steps of each moving object based on the captured image (step S218).

Next, the positional relationship extraction unit 205 extracts a mutual positional relationship of each moving object based on the captured image (step S218). For example, the positional relationship extraction unit 205 may determine a perspective relationship from the size or the like of each moving object imaged in the captured image and extract a mutual positional relationship between moving objects or a mutual positional relationship between each moving object and the environmental camera 20. The positional relationship extraction unit 205 may also extract a positional relationship between moving objects by performing true-range multilateration based on the distance between each moving object and the environmental camera 20.

Next, the authentication information extraction unit 207 extracts authentication information of each moving object from the captured image (step S224).

Then, the server 10 transmits the movement vector, walking steps, mutual positional relationship, and authentication information of each moving object to which the moving object number is assigned to the server 10 together with the camera ID and the time information (step S227). These pieces of information are stored in the captured image database 121 of the server 10. The server 10 performs a process of comparing newly stored information with a mutual positional relationship of each moving object in video of a previous time interval acquired from the environmental camera 20 of the camera ID already stored in the captured image database 121 and associating a moving object number of a moving object that is regarded as the same moving object.

An example of the operation process of the environmental camera 20 has been described above. The operation process of the environmental camera 20 does not necessarily have to be performed in the order shown in FIG. 9. For example, the processing shown in steps S215 to S224 may be performed in a different order or in parallel.

<3-3. Operation Process of Server 10>

Figure 10:
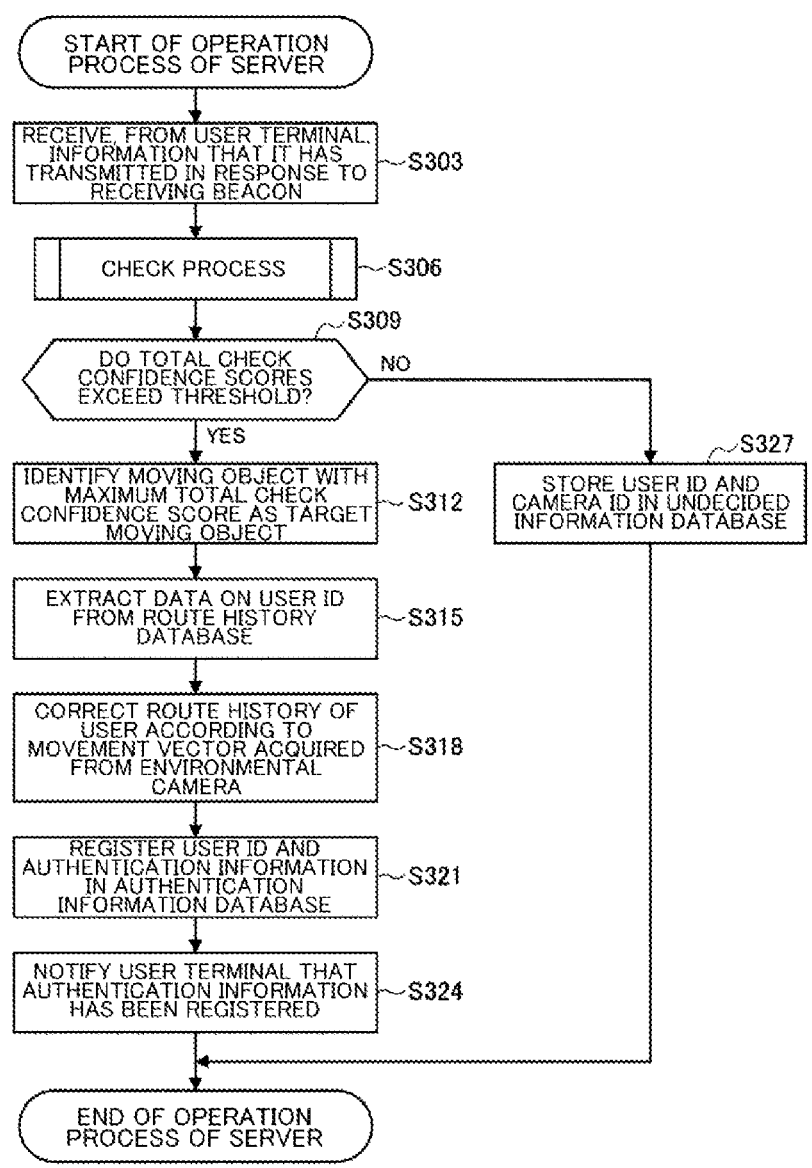
FIG. 10 is a flowchart showing an example of a flow of an operation process of the server according to the present embodiment.

Next, an operation process of the server 10 according to the present embodiment will be described. FIG. 10 is a flowchart showing an example of a flow of an operation process of the server 10 according to the present embodiment.

As shown in FIG. 10, first, the server 10 receives information that the user terminal 30 has acquired and transmitted to the server 10 triggered by receiving a beacon transmitted from the environmental camera 20 (step S303). As shown in step S127 of FIG. 8, upon detecting a beacon from the environmental camera 20, the user terminal 30 stores the time when it starts detecting the beacon and a camera ID (a MAC address included in the beacon). Next, the user terminal 30 acquires the distance between the user terminal 30 and the environmental camera 20 and distances to other user terminals present in the vicinity through the motion sensor unit 340. Then, the user terminal 30 sets the time when the beacon is lost as a detection end time of the beacon and transmits the detection start and end times of the beacon, the distance measurement data, the camera ID, and the user ID to the server 10.

Next, the control unit 100 of the server 10 performs a check process for checking the information obtained from the user terminal 30 with the information obtained from the environmental camera 20 (step S306). The check makes it possible to associate the user with a moving object displayed in the captured image (that is, identify the user). The information obtained from the user terminal 30 is the information received in step S303 and the information received from the user terminal 30 and stored in the route history database 122 as shown in step S118 of FIG. 8. The information obtained from the environmental camera 20 is the information received from the environmental camera 20 and stored in the captured image database 121 as shown in step S126 of FIG. 8. When the user has passed through an area within the angle of view of the environmental camera 20, it is possible to check information obtained from the captured image with information obtained from the user terminal 30 possessed by the user and it is also possible to correct the movement route of the user in the facility and register the authentication information.

The timing of performing the check process is not particularly limited. In the check process, the control unit 100 may calculate, for each check, a check confidence score indicating the reliability of the check (the possibility of being the user) and calculate, for each moving object, a check confidence score that sums the scores (referred to as a total check confidence score in the present specification). The summation may be, for example, a method of weighting and averaging the check confidence scores. Details of the check process and the check confidence score calculation will be described later.

Next, the association unit 106 determines whether the total check confidence scores exceed a threshold (step S309).

Next, when the total check confidence scores exceed the threshold (Yes in step S309), the association unit 106 identifies a moving object showing a maximum total check confidence score as a target moving object (that is, identifies it as the user) (step S312). Thus, a moving object displayed in the captured image can be associated with the user (specifically, the user ID obtained from the user terminal 30).

Next, the route update unit 108 extracts data on the user ID (the movement route history) associated with the moving object from the route history database 122 (step S315).

Next, the route update unit 108 corrects the route history of the user according to the movement vector acquired from the environmental camera 20 (step S318). Specifically, the route update unit 108 corrects the movement route of the user who has moved within the angle of view of the environmental camera 20 according to the movement vector (derived from the video) acquired from the environmental camera 20, such that it is possible to correct the error of the movement vector (derived from PDR) acquired from the user terminal 30.

The information registration unit 107 associates the user ID associated with the moving object with authentication information of the moving object acquired from the captured image and registers the associated authentication information in the authentication information database 123 (step S321). This makes it possible to automatically register authentication information such as the user's facial image (facial features).

Figure 11:
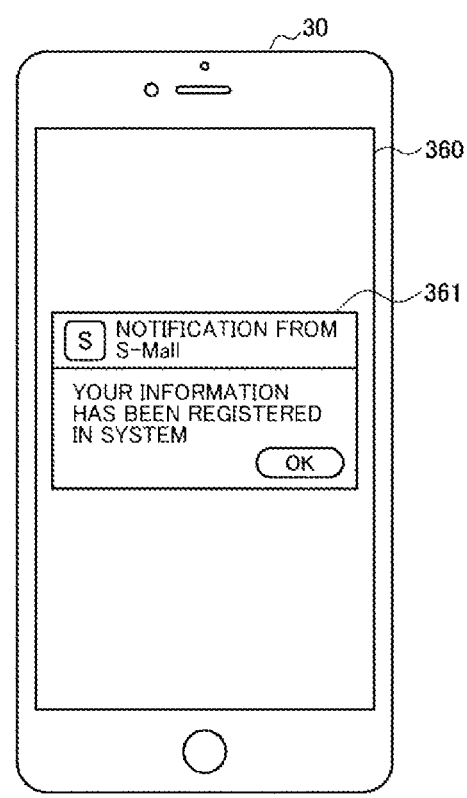
FIG. 11 is a diagram showing an example of a screen for notification of user authentication information registration according to the present embodiment.

Then, the information registration unit 107 notifies the user terminal 30 that the authentication information has been registered (step S324). Here, FIG. 11 is a diagram showing an example of a screen for notification of authentication information registration of the user according to the present embodiment. As shown in FIG. 11, a notification screen 361 is displayed on the display unit 360 of the user terminal 30. The notification screen 361 shows the name of the facility (for example, "S-Mall") and displays that information regarding the user has been registered in the system. For example, the user's approval can be obtained when an OK button on the notification screen 361 is tapped. The server 10 may delete the authentication information if the user's approval cannot be obtained.

Figure 12:
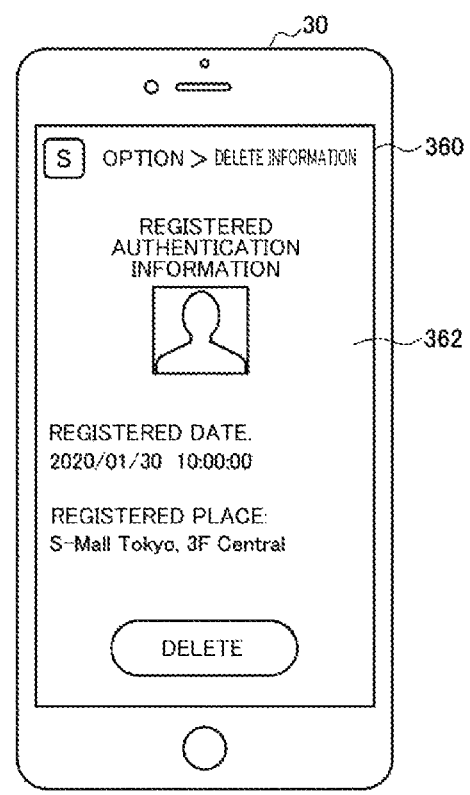
FIG. 12 is a diagram showing an example of a screen for deleting user authentication information according to the present embodiment.
Figure 13:
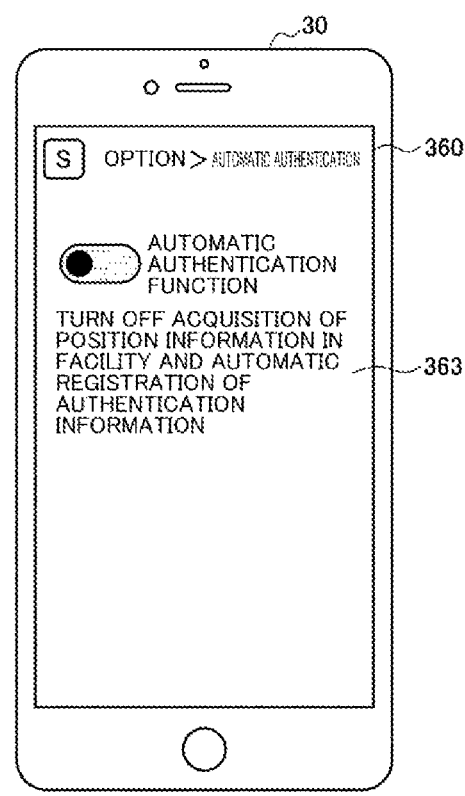
FIG. 13 is a diagram showing an example of a setting screen for automatic registration of user positioning and authentication information according to the present embodiment.

With a function of the application, the user may be allowed to arbitrarily delete the authentication information. FIG. 12 is a diagram showing an example of a screen for deleting authentication information. As shown in FIG. 12, registered authentication information is displayed on a deletion screen 362. When a delete button on the deletion screen 362 is tapped, the user terminal 30 sends a deletion request to the server 10 and the server 10 deletes the authentication information. A function of disabling automatic registration of positioning and authentication information in the facility may also be provided as a function of the application. With an opt-in type function, only users who have granted consent to turn on the setting when using the application may be subjected to automatic registration of positioning and authentication information. FIG. 13 is a diagram showing an example of a setting screen for automatic registration of positioning and authentication information. As shown in FIG. 13, a setting button may be displayed on the setting screen 363 such that the setting can be turned on/off.

On the other hand, when the total check confidence scores do not exceed the threshold (No in step S309), it is assumed that the user cannot be distinguished (identified) (cannot be associated) and the user ID and the camera ID are stored in the undecided information database 124 (step S327). The user ID and the camera ID that can be associated may be deleted from the undecided information database 124 when the association can be made later (a large number of environmental cameras 20 are installed in the facility and checks can be performed based on information obtained from the other environmental cameras 20).

An example of the operation process of the server 10 according to the present embodiment has been described above. The operation process of the server 10 does not necessarily have to be performed in the order shown in FIG. 10. For example, the processing shown in steps S315 and S318 and the processing shown in steps S321 and S324 may each be performed in a different order or in parallel.

4. Check Process and Check Confidence Score Calculation

Figure 14:
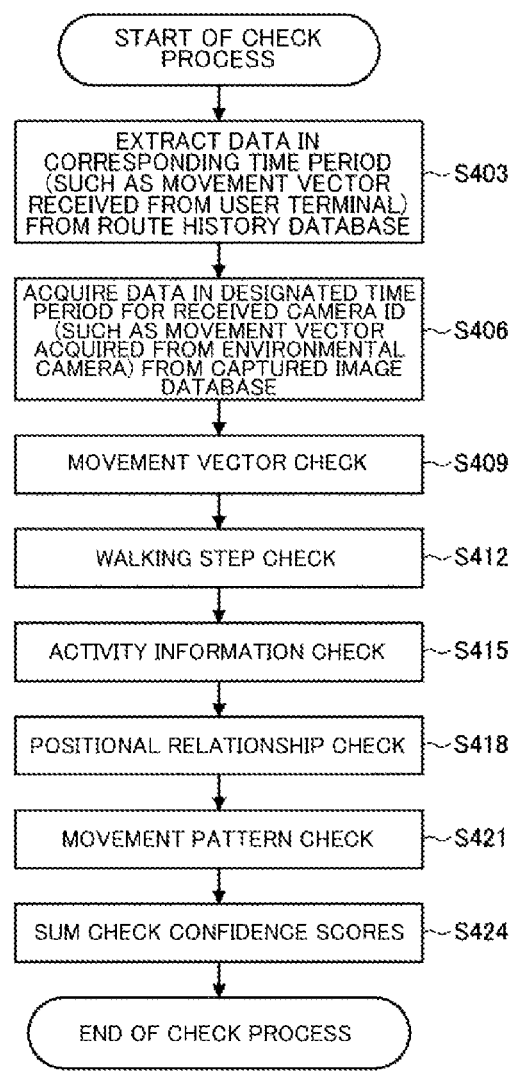
FIG. 14 is a flowchart showing an example of a flow of a check process according to the present embodiment.

Subsequently, the check process performed in step S306 of FIG. 10 and the calculation of check confidence scores will be described.
<3-4-1. Flow of Check Process>
FIG. 14 is a flowchart showing an example of a flow of a check process according to the present embodiment. As shown in FIG. 14, first, the control unit 100 extracts data in a corresponding time period (such as a user ID, a movement vector, and walking steps received from the user terminal 30) from the route history database 122 (step S403). The corresponding time period is the beacon detection start to end time of the user terminal 30 included in the information received from the user terminal 30 in step S303 of FIG. 10.

Next, the control unit 100 extracts data in the corresponding time period for a corresponding camera ID (such as a captured image, a movement vector, and walking steps acquired from the environmental camera 20) from the captured image database 121 (step S406). The corresponding camera ID is the camera ID included in the beacon detected by the user terminal 30, which is included in the information received from the user terminal 30 in step S303 of FIG. 10.

Next, the control unit 100 performs a movement vector check (step S409), a walking step check (step S412), an activity information check (step S415), a positional relationship check (step S418), and a movement pattern check (step S421) based on the extracted data. In each check process, a check confidence score is calculated for each moving object.

Then, the association unit 106 sums the check confidence scores calculated in the check processes for each moving object (step S424). The summation method is not particularly limited and may be, for example, a method of weighting and averaging the check confidence scores.

An example of the flow of the check process has been described above. The check process does not necessarily have to be performed in the order shown in FIG. 14. For example, the checks shown in steps S409 to S421 may be performed in a different order or in parallel. Further, all checks shown in steps S409 to S421 may be performed or at least one of the checks may be performed. If a check is successful (that is, if a moving object corresponding to the user can be identified) when sequentially performing the check processes, the control unit 100 may skip the other check processes that follow the successful check.

The control unit 100 may also perform at least two checks including "a movement vector check" and "at least one of the walking step, activity information, positional relationship, and movement pattern checks". When the user cannot be distinguished (identified) by the movement vector check alone, the control unit 100 may further perform at least one of the walking step, activity information, positional relationship, and movement pattern checks. The association unit 106 may combine the check results and identify a moving object which matches the most in the checks (which is the most successful in the checks) as the user.

Next, each check process will be described.
<4-2. Movement Vector Check and Check Confidence Score Calculation>

In the movement vector check, for example, the cosine similarity is calculated as described with reference to FIG. 2. In this case, the movement vector check unit 101 may use the cosine similarity between a movement vector ($mv_{can}$) obtained from the environmental camera 20 and a movement vector ($mv_{acc}$) obtained from the user terminal 30 as a check confidence score (Pmv) of the movement vector as shown in expression 1 below.

[Math. 1]

$$P_{mv} = \cos(\overrightarrow{mv_{cam}}, \overrightarrow{mv_{acc}}) \qquad \text{Expression 1}$$

<4-3. Walking Step Check and Check Confidence Score Calculation>

In the walking step check, for example, the degree of timing match between the timings of walking steps (foot-ground contacts) obtained from the image captured by the environmental camera 20 and the timings of walking steps (foot-ground contacts) obtained from sensing data of the user terminal 30 is calculated.

Here, the calculation of the degree of timing match of walking steps will be described with reference to FIGS. 15 to 18.

Figure 15:
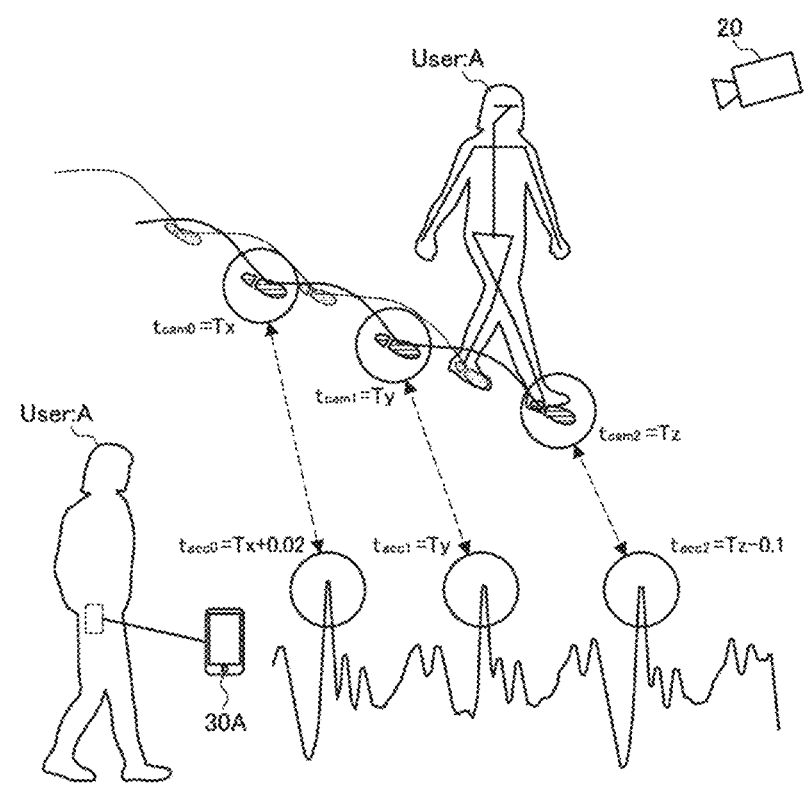
FIG. 15 is a diagram illustrating the timings of walking steps of a user obtained from a captured image of an environmental camera and the timings of walking steps of the user obtained from sensing data of the user terminal according to the present embodiment.

FIG. 15 is a diagram illustrating the timings of walking steps of a user A obtained from a captured image of the environmental camera 20 and the timings of walking steps of the user A obtained from sensing data of the user terminal 30A. The user terminal 30A analyzes, for example, the acceleration of three axes detected by the motion sensor unit 340 to detect foot-ground contact timings ($t_{acc0}$, $t_{acc1}$, $t_{acc2}$). Here, it is assumed, for example, that the user terminal 30A is in either the left or right pocket of the trousers of the user A and the ground contact timings of one foot are detected from peaks of a waveform of the acceleration.

The waveform of the acceleration of three axes shown in FIG. 15 is an example and the present embodiment is not limited to this. On the other hand, the environmental camera 20 detects, for example, a foot (shoe) region and a head region of the user A from the captured image and detects foot-ground contact timings ($t_{cam0}$, $t_{cam1}$, $t_{cam2}$) from the positions (movement) of the regions. The environmental camera 20 may perform bone detection (skeleton recognition) or the like from the captured image to detect foot-ground contact timings from the waist position of the user A. The environmental camera 20 may separately detect the ground contact timings of the right foot and the ground contact timings of the left foot or may detect the ground contact timings of both feet and divide them to calculate the ground contact timings of one foot. Then, the walking step check unit 102 calculates the degree of timing match (time difference) of each of the ground contact timings (the ground contact timings of one foot) to perform a walking step check. In the present embodiment, the ground contact timings of one foot are checked as an example, but the present disclosure is not limited to this and the walking step check unit 102 may check the ground contact timings of both feet. For example, when the user terminal 30 is in the user's backpack or handbag, the ground contact timings of both feet may sometimes be exhibited as peaks in acceleration. The user terminal 30 can also determine its holding position (whether it is in a holding position where left-right differences occur or a holding position where no left-right differences occur) through machine learning of the motion sensor unit 340.

Figure 16:
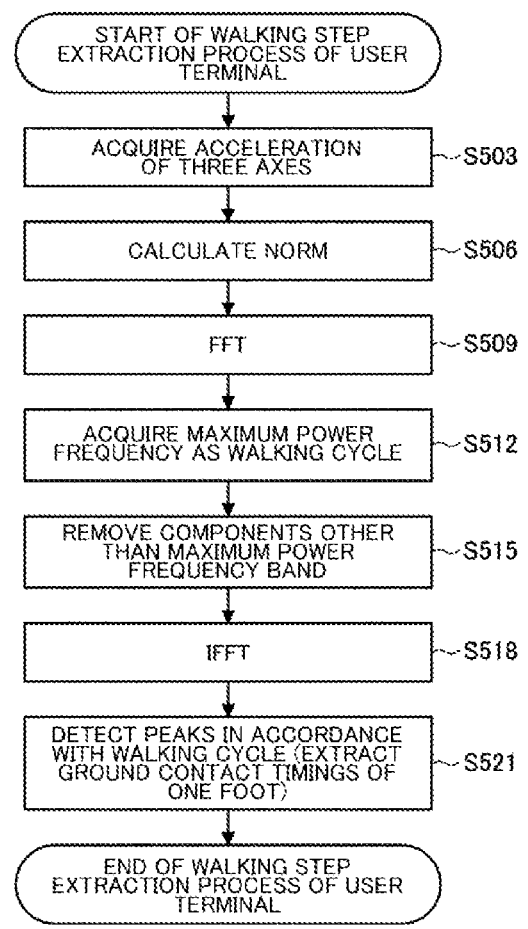
FIG. 16 is a flowchart showing an example of a flow of a walking step extraction process of the user terminal according to the present embodiment.

FIG. 16 is a flowchart showing an example of a flow of a walking step extraction process of the user terminal 30. As shown in FIG. 16, first, the walking step extraction unit 302 acquires acceleration of three axes from the motion sensor unit 340 (step S503).

Next, the walking step extraction unit 302 calculates a norm from the acceleration of three axes (step S506) and performs a fast Fourier transform (FFT) on the calculated result (step S509).

Next, the walking step extraction unit 302 acquires a maximum power frequency from the FFT processing result as a walking cycle (step S512).

Next, the walking step extraction unit 302 removes components other than the maximum power frequency band (step S515).

Next, the walking step extraction unit 302 performs an inverse fast Fourier transform (IFFT) on data from which the components other than the maximum power frequency band have been removed (step S518).

Then, the walking step extraction unit 302 detects peaks in accordance with the walking cycle from data obtained by performing the IFFT to extract the ground contact timings of one foot (step S521).

The extraction of walking steps based on acceleration data has been explained above. The extraction of walking steps described with reference to FIG. 16 is an example and the method of extracting walking steps according to the present embodiment is not limited to this.

Figure 17:
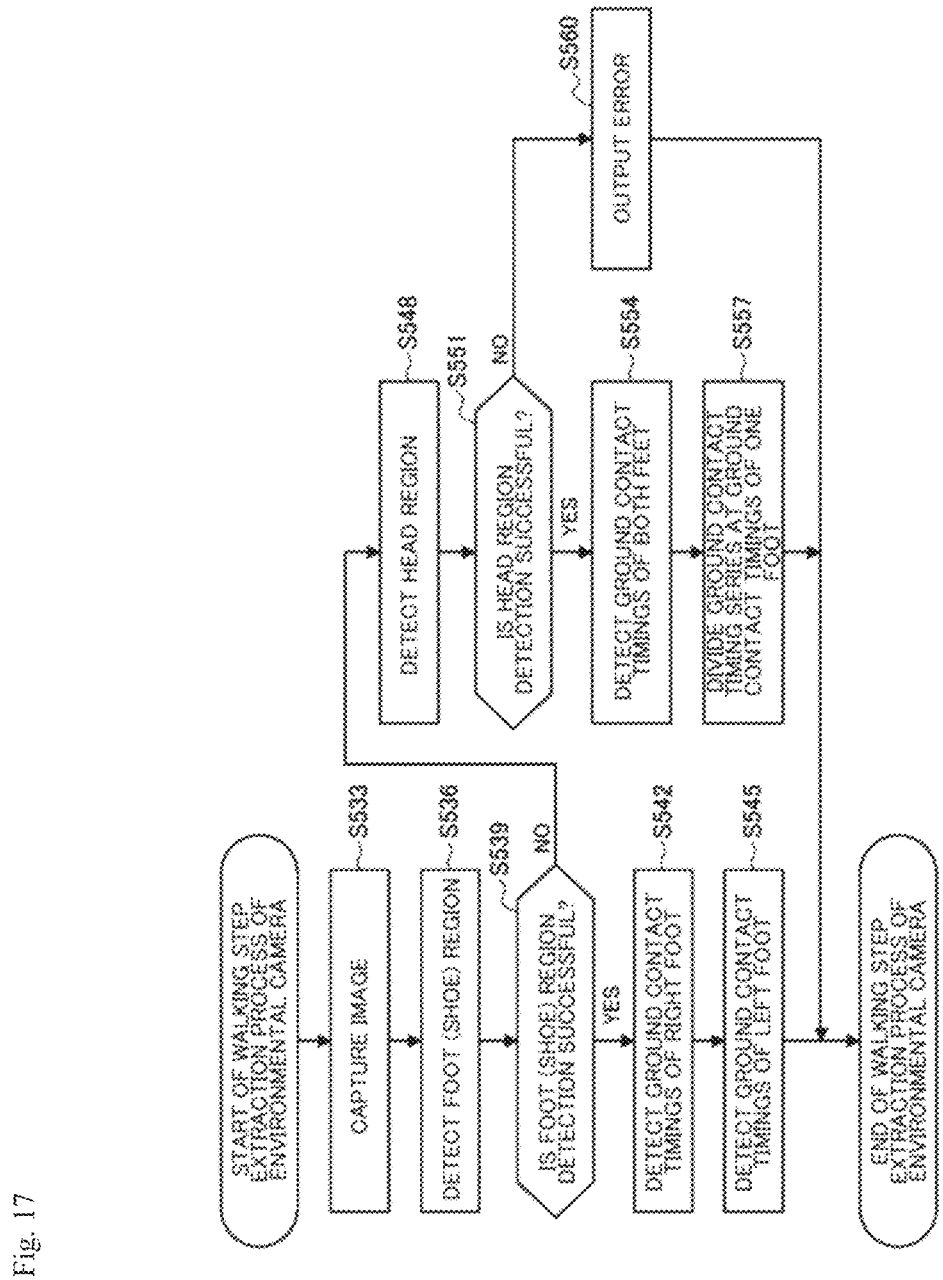
FIG. 17 is a flowchart showing an example of a flow of a walking step extraction process of the environmental camera according to the present embodiment.

FIG. 17 is a flowchart showing an example of a flow of a walking step extraction process of the environmental camera 20. As shown in FIG. 17, first, the environmental camera 20 captures an image with the imaging unit 220 (step S533).

Next, the walking step extraction unit 204 detects a foot (or shoe) region from the captured image (step S536).

Next, when the foot (shoe) region can be detected (Yes in step S536), the walking step extraction unit 204 detects the ground contact timings of the right foot and the ground contact timings of the left foot from the state of the foot (shoe) (steps S542 and S545). Generally, when a human walks, he or she lands on the heel and steps on the toes and therefore the walking step extraction unit 204 may detect the ground contact of the heel. Depending on the imaging conditions, for example, a frame in which the absolute value of the movement vector of the heel becomes zero first in each cycle of walking may be set as a ground contact timing. Alternatively, a frame in which a vector from the heel to the toe is first brought parallel to the ground from a state where the vector is oriented toward the sky may be set as a ground contact timing. Here, the walking step extraction unit 204 separately detects the ground contact timings of the right foot and the left foot because the ground contact timings of one foot are checked in the present embodiment as an example.

On the other hand, when no foot (shoe) region can be detected (No in step S536), the walking step extraction unit 204 detects a head region (step S548).

When a head region can be detected (Yes in step S551), the walking step extraction unit 204 detects the ground contact timings of both feet according to the head position (step S554) and divides the ground contact timing series at the ground contact timings of one foot (step S557). In general, the body moves up and down during walking and sinks most when contacting the ground and therefore the walking step extraction unit 204 determines that a frame in which the head position (for example, the position of the crown) is at the bottom in each walking cycle is a ground contact timing. However, to obtain series data for one foot, the walking step extraction unit 204 needs to divide the ground contact timings by alternate allocation in chronological order because it is not known which of the left and right feet contacts the ground.

Utilizing the fact that, when a human walks, he or she does a motion called a "compensatory rotation of the head" in which the head is tilted up and down as he or she sinks such that his or her viewpoint does not deviate in addition to the head position described above, the walking step extraction unit 204 can also perform a process of selecting a frame with a maximum pitch angle of the head in parallel to improve the accuracy.

On the other hand, if no head region can be detected (No in step S551), the walking step extraction unit 204 outputs an error.

Here, the ground contact timings are detected by foot detection or head detection as an example, but the present embodiment is not limited to this. For example, when the skeleton can be recognized from the captured image, the walking step extraction unit 204 may detect the timing at which the angle of the lower limbs is maximized and the directions of the vertical movement vectors of the left and right feet are switched as a ground contact timing. The walking step extraction unit 204 may also detect the ground contact timings based on the waist position. The waist position sinks most at the timing of ground contact in a walking cycle. When the face can be recognized from the captured image, the walking step extraction unit 204 may detect lower limits of cycles of the vertical movement vector of the face part as ground contact timings.

The extraction of walking steps based on the captured image has been explained above. The extraction of walking steps described with reference to FIG. 17 is an example and the method of extracting walking steps according to the present embodiment is not limited to this.

Figure 18:
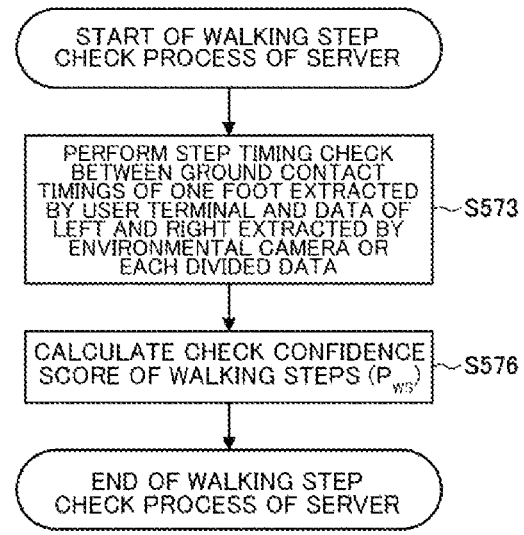
FIG. 18 is a flowchart showing an example of a flow of a walking step check process of the server according to the present embodiment.

FIG. 18 is a flowchart showing an example of a flow of a walking step check process of the server 10. As shown in FIG. 18, first, the walking step check unit 102 performs a step timing check between the ground contact timings of one foot extracted by the user terminal 30 and the data of the left and right extracted by the environmental camera 20 (see steps S542 and S545 above) or each divided data (see step S557 above) (step S573). The walking step check unit 102 may determine that the timings of walking steps match when the time difference between the ground contact timing of one foot obtained from the environmental camera 20 ($t_{cam0}$=Tx, $t_{cam1}$=Ty, $t_{cam2}$=Tz) and the ground contact timing of one foot obtained from the user terminal 30A ($t_{acc0}$=Tx+0.02, $t_{acc1}$=Ty, $t_{acc2}$=Tz−0.1) is equal to or less than a threshold as shown in FIG. 15. When data on the ground contact timings of the right foot and the ground contact timings of the left foot has been obtained from the environmental camera 20, the walking step check unit 102 calculates the time differences with the ground contact timings of the right foot and the ground contact timings of the left foot and adopts those with the smaller total time difference.

More specifically, for example, the walking step check unit 102 may be successful in the check when the following expression 2 is satisfied. In the present embodiment, a moving object with a movement vector satisfying the following expression 2 can be distinguished (identified) as the user.

[Math. 2]

$$\frac{\sum_{k=1}^{n}|t_{cam\_k} - t_{acc\_k}|}{n} < \text{Threshold} \quad \text{Expression 2}$$

Next, the walking step check unit 102 calculates a check confidence score ($P_{ws}$) of the walking step (step S576). For example, the walking step check unit 102 may calculate a time difference ($T_{diffws}$) between walking steps (ground contact timings $t_{cam}$) obtained from the environmental camera 20 and walking steps (ground contact timings $t_{acc}$) obtained from the user terminal 30 as shown in the following expression 3 and calculate a check confidence score ($P_{ws}$) of walking steps based on how close the time difference is to 0 within an allowable range (Threshold$_{ws}$) as shown in expression 4 below.

[Math. 3]

$$T_{diffws} = \frac{\sum_{k=1}^{n}|t_{cam\_k} - t_{acc\_k}|}{n} \quad \text{Expression 3}$$

[Math. 4]

$$P_{ws} = \begin{cases} 1.0 - \frac{T_{diffws}}{\text{Threshold}} & (T_{diffws} < \text{Threshold}_{ws}) \\ 0.0 & (T_{diffws} \geq \text{Threshold}_{ws}) \end{cases} \quad \text{Expression 4}$$

Although the method of checking walking steps and calculating a check confidence score has been described above, the above method is an example and the method of checking walking steps and calculating a check confidence score according to the present embodiment is not limited thereto. Although walking steps indicating the timings at which the foot contacts the ground are used here as an example, the present embodiment is not limited thereto and any features relating to walking such as a walking gait, a walking rhythm, or a walking posture may be used as state information to perform a check.

<4-4. Positional Relationship Check and Check Confidence Score Calculation>

In the positional relationship check, the positional relationship check unit 103, which compares the mutual positional relationship of each moving object within the angle of view of the environmental camera 20 with the mutual positional relationship of the user terminal 30 calculated based on distance information acquired by the user terminal 30, distinguishes (identifies) the user from one or more moving objects imaged in the captured image based on the comparison of the mutual positional relationships.

Here, a mutual positional relationship is a positional relationship between the user terminal 30 and other user terminals, a positional relationship between the user terminal 30 and the environmental camera 20, or a positional relationship between the user terminal 30, other user terminals, and the environmental camera 20. The mutual positional relationship may be a distance or may be that of global coordinates into which it has been converted.

Figure 19:
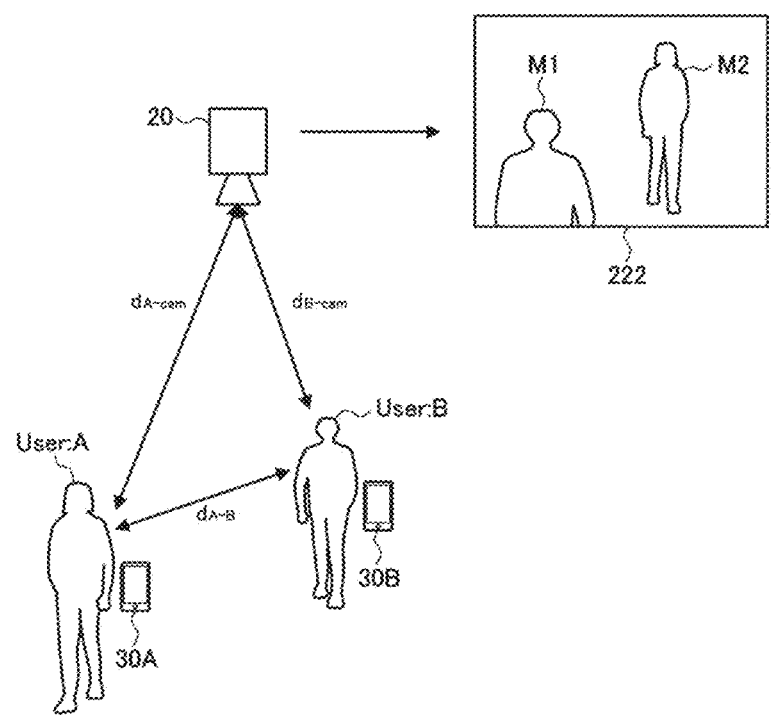
FIG. 19 is a diagram illustrating a mutual positional relationship check according to the present embodiment.

The positional relationship check unit 103 may calculate a mutual positional relationship of a third party based on distance information (information on distances to other user terminals and information on a distance to the environmental camera 20) that the user terminal 30 has acquired through the distance measuring unit 330. For example, the positional relationship check unit 103 calculates mutual positional relationships based on a distance ($d_{A-cam}$) between a user A and the environmental camera 20 and a distance ($d_{A-B}$) between the user A and a user B as shown in FIG. 19. A distance ($d_{B-cam}$) between the user B and the environmental camera 20 can be obtained from a user terminal 30B. Alternatively, the positional relationship check unit 103 may use distance information (which can be acquired by the distance measuring unit 230) that the environmental camera 20 has acquired by performing UWB communication or the like with each of the user terminal 30A and the user terminal 30B.

On the other hand, the positional relationship check unit 103 calculates a positional relationship of each moving object based on a captured image obtained from the environmental camera 20. For example, the positional relationship check unit 103 analyzes a captured image 222 to estimate perspective relationships (positional relationships) of moving objects (a moving object M1 and a moving object M2) imaged in the captured image 222 as shown in FIG. 19.

At this time, the positional relationship check unit 103 may refer to data from the depth sensor or the like provided in the environmental camera 20.

Then, the positional relationship check unit 103 checks a positional relationship that has been obtained from the user terminal 30 through the distance measuring unit 330 with a positional relationship that has been obtained from the environmental camera 20 through video and associates the user A (the person who possesses the user terminal 30A) with a moving object. For example, the positional relationship check unit 103 may calculate a check confidence score for each moving object based on the degree of match between the mutual positional relationships. For example, the positional relationship check unit 103 may calculate a check confidence score based on how close the mutual positional relationship difference is to 0 within an allowable range.

Although a check considering the positional relationship between users has been described above, the present embodiment is not limited to this. For example, the server 10 holds distance information (d$_{rf}$ between the user terminal 30 and the environmental camera 20 obtained by the user terminal 30 and distance information (d$_{cam}$) between moving objects and the environmental camera 20 estimated from video of the environmental camera 20. For each frame in the video of the environmental camera 20, the positional relationship check unit 103 of the server 10 compares these distances (the distance d$_{rf}$ and each distance d$_{cam}$) and calculates a check confidence score according to the number of moving objects for which the difference is within an allowable range (Tolerance$_{rel}$). Next, the positional relationship check unit 103 determines that an average of the check confidence scores for frames is a check confidence score as a final check result of the mutual positional relationship. The check confidence score is calculated for each moving object. It can be said that, of the moving objects shown in the video, a moving object having the maximum check confidence score is a moving object to be searched for (that is, the user). Hereinafter, a specific description will be given with reference to FIG. 20.

Figure 20:
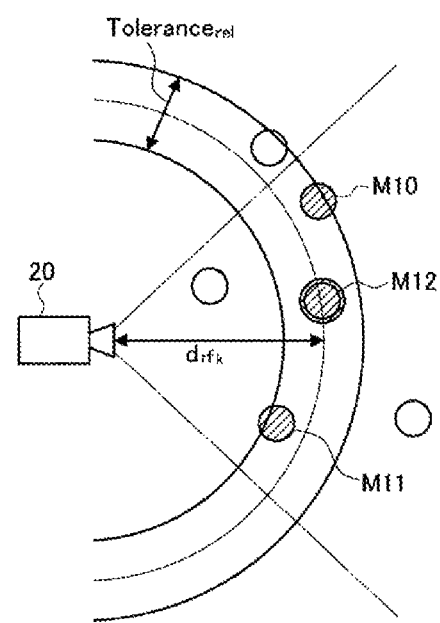
FIG. 20 is a diagram illustrating another example of a mutual positional relationship check according to the present embodiment.

FIG. 20 is a diagram illustrating another example of a mutual positional relationship check according to the present embodiment. FIG. 20 is a diagram showing an arrangement of the environmental camera 20 and moving objects M at a certain timing (frame k=i). For each frame (k) in a time interval to be analyzed, the positional relationship check unit 103 calculates a check confidence score (P$_{rel}$) of the mutual positional relationship (relation) based on the number (Nk) of moving objects (moving object numbers: IDs) for which distances (d$_{cam\ k:ID}$) estimated from the video of the environmental camera 20 are at a distance (d$_{rfk}$) between the user terminal 30 and the environmental camera 20 obtained from the user terminal 30 or within a range of allowable errors (Tolerance$_{rel}$). In the example shown in FIG. 20, the moving objects M10, M11, and M12 are located at the distance (d$_{rfk}$) obtained from the user terminal 30 or within the range of allowable errors (Tolerance$_{rel}$) and the number of moving objects is "3" (where a target possessing the user terminal 30 is M12).

The positional relationship check unit 103 counts the number of moving objects within the allowable range, for example, as shown in the following expressions 5 and 6. In the following expression 6, a subscript "k:ID" indicates data of a kth frame for a moving object number ID.

[Math. 5]

$$Ext_{k:ID} = \begin{cases} 1 & (|d_{cam_{k:ID}} - d_{rf_k}| < \text{Tolerance}_{rel}) \\ 0 & (|d_{cam_{k:ID}} - d_{rf_k}| \geq \text{Tolerance}_{rel}) \end{cases} \quad \text{Expression 5}$$

[Math. 6]

$$N_k = \sum_{ID} Ext_{k:ID} \quad \text{Expression 6}$$

When there are many moving objects within the range of allowable errors (Tolerance$_{rel}$), the check confidence score (P$_{rel\ k}$) is low because there is a high probability that target moving object identification (user identification) will be incorrect. On the contrary, when there is only one moving object within the range of allowable errors (Tolerance$_{rel}$), the confidence score in that frame is 1.0. The positional relationship check unit 103 calculates a check confidence score (P$_{rel\ k}$) in each frame, for example, as shown in the following expression 7.

[Math. 7]

$$P_{rel_k} = \begin{cases} 1.0 - \log_{Threshold_{rel}}(N_k) & (N_k < \text{Threshold}_{rel}) \\ 0.0 & (N_k \geq \text{Threshold}_{rel}) \end{cases} \quad \text{Expression 7}$$

In the example shown in FIG. 20 (at a certain timing (frame k=i)), for example, when Threshold$_{rel}$=10, the number of moving objects present within Threshold$_{rel}$ is 3 (Ni=3) and the check confidence score for each moving object (M10, M11, M12) in the frame is calculated as P$_{rel\ i}$=1−log$_{10}$(3)≈0.52.

Then, an average of the check confidence scores of each moving object calculated over frames is determined to be a final check confidence score (P$_{rel}$) of each moving object. The positional relationship check unit 103 calculates the final check confidence score (P$_{rel}$), for example, as shown in the following expression 8.

[Math. 8]

$$P_{rel} = \frac{\sum_{k=1}^{n} P_{rel_k}}{n} \quad \text{Expression 8}$$

Note that the frame length (time interval between frames) may be set, for example, to 1 second because the interval is short when adjusted to the frame rate of the environmental camera 20.

It is also possible to perform a positional relationship check by finding an optimal solution using distance information between three people over a plurality of frames. This will be described below with reference to FIG. 21.

Figure 21:
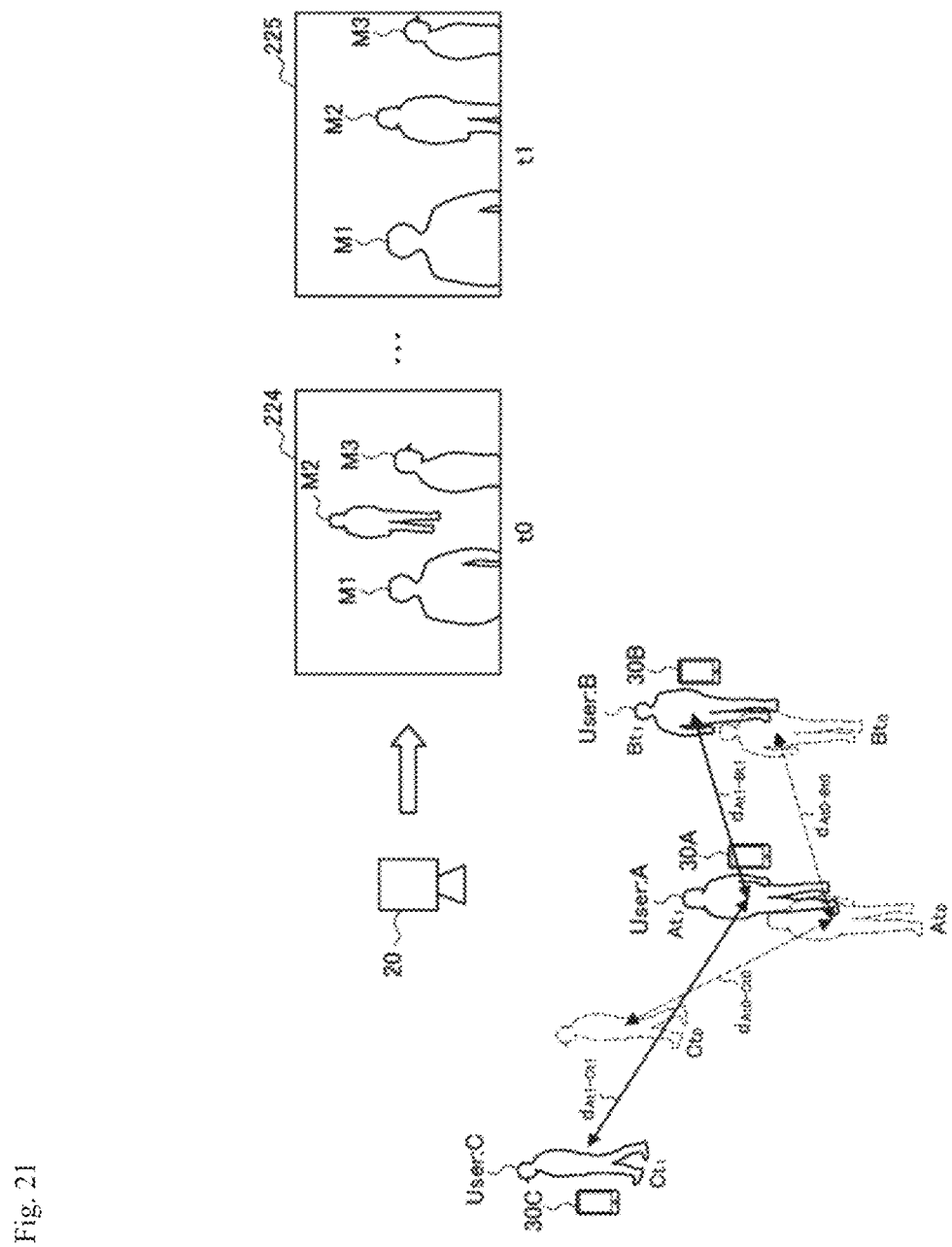
FIG. 21 is a diagram illustrating another example of a mutual positional relationship check according to the present embodiment.

FIG. 21 is a diagram illustrating another example of a mutual positional relationship check according to the present embodiment. This example uses distance information between the user terminal 30 and other user terminals measured by the user terminal 30. As shown in FIG. 21, the user terminal 30A periodically acquires distance information between it and other user terminals 30B and 30C in the vicinity (distance measurement data: d$_{At0-Bt0}$, d$_{At0-Ct0}$, d$_{At1-Bt1}$, d$_{At1-Ct1}$) while it is within the angle of view of the environmental camera 20 (while it receives a beacon). Next, the user terminal 30A sends the measured distance measurement data to the server 10 when it is out of the angle of view (the beacon is lost).

The positional relationship check unit 103 of the server 10 estimates distances between moving objects (distances between moving objects M1, M2, and M3), which are present in video obtained from the environmental camera 20, from the video of each frame and performs a full search to find a combination which minimizes an error with respect to distance information measured by the user terminal 30A.

When a cumulative error between the distances estimated from the video and the distances measured by the user terminal 30A is the smallest and is equal to or less than a threshold, the positional relationship check unit 103 determines that a corresponding moving object is a search target (a moving object corresponding to the user).

A check confidence score can be calculated based on a difference between the cumulative error and the threshold. For example, $P_{rel}=1-\text{diff/threshold}$ may be set and $P_{rel}=0$ may be set when the threshold is exceeded. When N (N≥2) optimal solutions have been found as a result of the full search, a value obtained by dividing $P_{rel}$ by N is output as a check confidence score.

Although the method of checking positional relationships and calculating a check confidence score has been described above, the above method is an example and the method of checking positional relationships and calculating a check confidence score according to the present embodiment is not limited thereto.

<4-5. Activity Information Check and Check Confidence Score Calculation>

In the activity information check, a switching time between walking and a specific activity immediately before or after a walking section (such as, for example, using an elevator, using an escalator, and using stairs) which is detected by the user terminal 30 and a switching time between walking and the specific activity of a moving object which is captured by the environmental camera 20 are compared.

Figure 22:
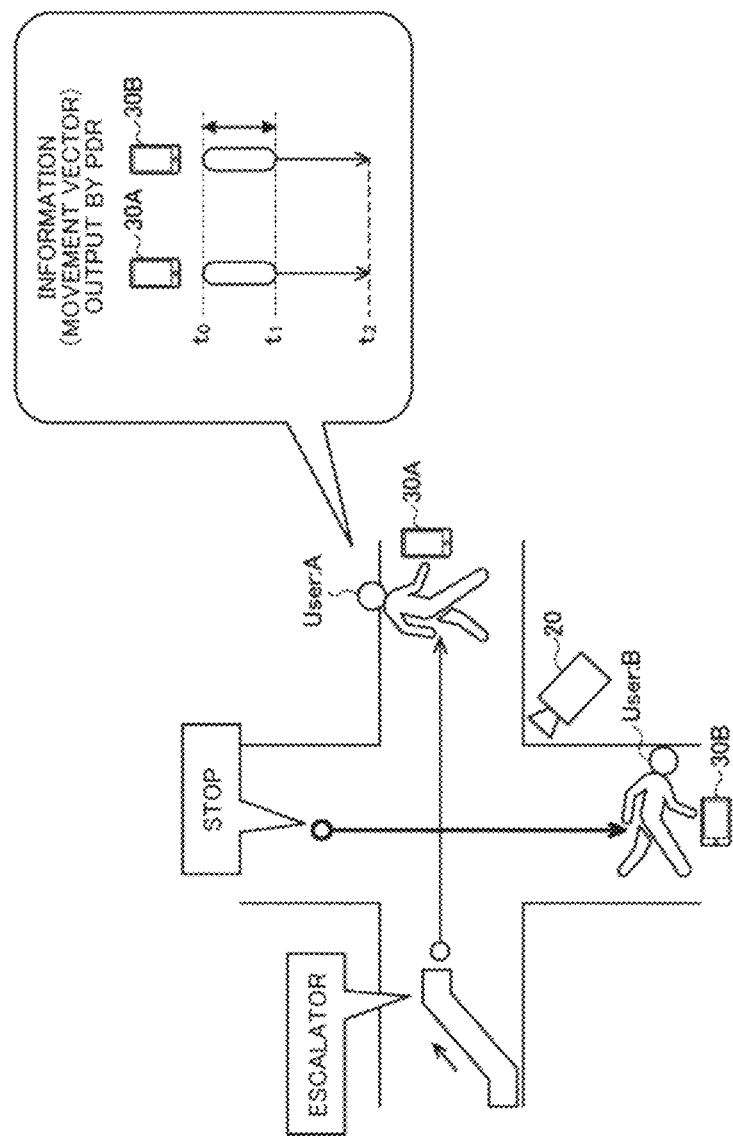
FIG. 22 is a diagram illustrating an activity information check according to the present embodiment.

For example, a user A who is on an escalator and a user B who is merely stationary on the spot are identical and cannot be distinguished from each other when seen with movement vectors derived from PDR alone since the user A does not move on foot while riding on the escalator as shown in FIG. 22. Therefore, the present embodiment compares, when a specific activity is detected before and after a walking section, the switching time between the activity and walking, such that it is possible to identify the user. The specific activity can be identified from a captured image and in-house map information. For example, the user A who has got off the escalator and started walking can be detected from the captured image when the escalator is included in the angle of view of the environmental camera 20 shown in FIG. 22. The user B who has stopped for a while on the spot and then started walking can also be detected from the captured image shown in FIG. 22. The activity information check unit 104 can determine the locations of escalators, elevators, stairs, or the like not only from the captured image but also from the in-house map information and thus can detect a specific activity from the in-house map information and a movement trajectory detected by the user terminal 30.

For example, the activity information check unit 104 may set a check confidence score ($P_{act}$) of the activity to 1.0 when a time difference ($T_{diff\_ws}$) between the switching times between the activity and walking is within an allowable range (Tolerance$_{act}$) and may set it 0.0 otherwise as shown in the following expression 9.

[Math. 9]

$$P_{act} = \begin{cases} 1.0 & (T_{diff_{ws}} < \text{Threshold}_{act}) \\ 0.0 & (T_{diff_{ws}} \geq \text{Threshold}_{act}) \end{cases}$$ Expression 9

Although the method of checking activity information and calculating a check confidence score has been described above, the above method is an example and the method of checking activity information and calculating a check confidence score according to the present embodiment is not limited thereto.

<4-6. Movement Pattern Check and Check Confidence Score Calculation>

In the movement pattern check, whether the movement pattern agrees with a rule (a movement pattern) that has been preset from map information of the facility and the arrangement of environmental cameras 20 is determined based on a movement vector (PDR position information) acquired by the user terminal 30 and an integration of information from a plurality of environmental cameras 20 (a chain of multiple cameras).

The movement pattern check unit 105 sets a check confidence score ($P_{ch}$) to 1.0 when the movement pattern matches a movement pattern that agrees with the rule and sets the check confidence score to 0.0 otherwise. Hereinafter, a specific description will be given with reference to FIG. 23.

Figure 23:
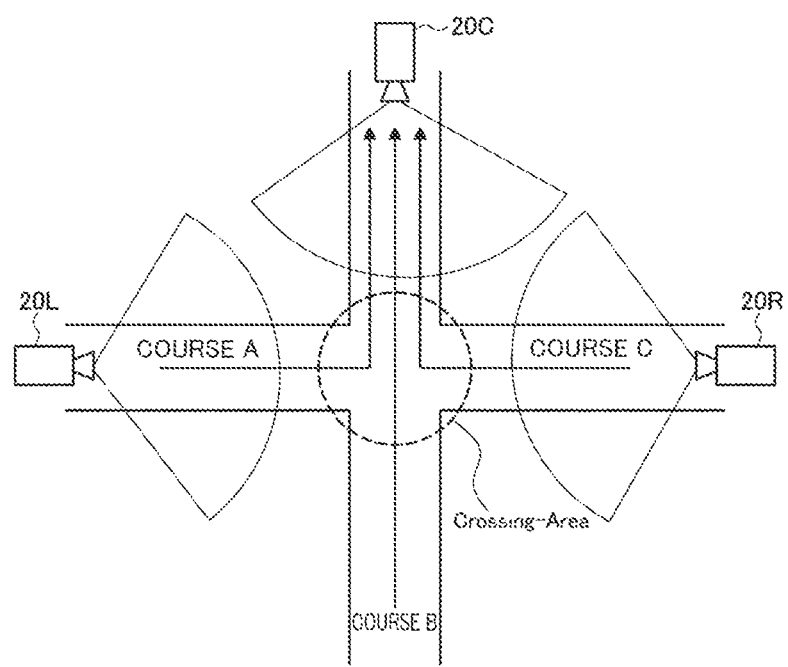
FIG. 23 is a diagram illustrating a movement pattern check according to the present embodiment.

FIG. 23 is a diagram illustrating a movement pattern check according to the present embodiment. In FIG. 23, environmental cameras 20R, 20L, and 20C are arranged. The server 10 holds such an arrangement of environmental cameras 20 and map information.

Rule 1: Course A

For example, a moving object, which has entered the angle of view of the environmental camera 20C after it has been detected by the user terminal 30 through PDR that it has turned 90°±45° left in a crossing area shown in FIG. 23, is highly likely to have passed a course A. The movement pattern check unit 105 determines whether a moving object to be matched imaged by the environmental camera 20C is also imaged by the environmental camera 20L (where whether moving objects match (are the same person) can be found based on appearance features of each moving object such as a face, clothes, a walking gait, and a skeleton). Then, when the moving object to be matched imaged by the environmental camera 20C is also imaged by the environmental camera 20L, the movement pattern check unit 105 determines that the moving object is the search target (corresponding to the user) and sets the check confidence score to 1.0. On the other hand, when the moving object imaged by the environmental camera 20C is not found in the video of the environmental camera 20L, the movement pattern check unit 105 sets the check confidence score to 0.0.

Rule 2: Course B

A moving object, which has entered the angle of view of the environmental camera 20C after it has been detected through PDR of the user terminal 30 that it has moved straight in the crossing area without turning, is highly likely to have passed a course B. The movement pattern check unit 105 sets the check confidence score to 0.0 when a moving object to be matched imaged by the environmental camera 20C is also imaged in video of the environmental camera 20L or the environmental camera 20R and sets it to 1.0 when it is not imaged by any of them.

Rule 3: Course C

A moving object, which has entered the angle of view of the environmental camera 20C after it has been detected by the user terminal 30 through PDR that it has turned 90°±45° right in the crossing area, is highly likely to have passed a course C. When a moving object to be matched imaged by the environmental camera 20C is also imaged by the environmental camera 20R, the movement pattern check unit 105 determines that the moving object is the search target and sets the check confidence score to 1.0. On the other hand, when the moving object imaged by the environmental camera 20C is not found in the video of the environmental camera 20R, the movement pattern check unit 105 sets the check confidence score to 0.0.

Although the method of performing a movement pattern check (a check based on an integration of information from a plurality of cameras) and calculating a check confidence score has been described above, the above method is an example and the method of checking the movement pattern and calculating a check confidence score according to the present embodiment is not limited thereto.

<4-7. Summation of Check Confidence Scores>

The association unit 106 sums the check confidence scores output from the check units for each moving object and finally identifies the user (associates the user with a moving object) based on each sum of check confidence scores. A sum of check confidence scores may be calculated by weighting and averaging the scores, for example, as shown in the following expression 10.

[Math. 10]

$$Score_{confidence} = \quad\quad\quad\quad\quad \text{Expression 10}$$
$$w_{mv} \cdot P_{mv} + w_{ws} \cdot P_{ws} + w_{act} \cdot P_{act} + w_{rel} \cdot P_{rel} + w_{ch} \cdot P_{ch}$$
$$\begin{pmatrix} w_{mv} + w_{ws} + w_{act} + w_{rel} + w_{ch} = 1.0, \\ 0.0 \le Score_{confidence} \le 1.0 \end{pmatrix}$$

Here, suffixed w are weighting coefficients for the check confidence scores calculated by the check units and these weights may be set to fixed values heuristically, for example, according to characteristics based on the floor shape of the target facility and characteristics based on the arrangement of environmental cameras or learning data may be collected at the target facility and the weights may be adjusted by machine learning.

5. Application Examples

Next, various application examples such as utilization of authentication information registered according to the present embodiment and an information notification service according to the movement route and activity of an identified user will be described. Although the server 10 that provides various services will be described here as an example, the present disclosure is not limited to this and various services may be provided by a server or the like separate from the server 10.

5-1. First Application Example

Upon detecting a person who performs a predetermined activity at a predetermined place that been set in advance from video obtained by the environmental camera 20, the server 10 notifies the person of predetermined information. For example, upon detecting a person area from the video and then detecting a predetermined activity, the environmental camera 20 converts the coordinates of the person in the video into global coordinates and notifies the server 10 of the global coordinates and the detection time. The environmental camera 20 may also transmit the content of the detected activity to the server 10 (and for example, when a plurality of predetermined activities are defined, the environmental camera 20 also notifies the server 10 of which activity has been detected).

The server 10 extracts the user ID of the person who was at the coordinates at the time from the route history database 122 based on time information and coordinate information received from the environmental camera 20. The route history database 122 stores the movement route (position information) history of each user as needed as described above.

Then, the server 10 performs control for transmitting predetermined information to the user terminal 30 associated with the user ID. An association between the user ID and the user terminal 30 can be made, for example, such that an address or the like of the user terminal 30 is registered in association with the user ID in advance when the user creates an account in order to use the present system.

When the association and movement route accumulation of the user is performed in real time, the server 10 can also instantly notify the user terminal 30 of appropriate information. Here, FIG. 24 illustrates a recognized activity and a service provided to the user according to an application example of the present embodiment. As shown in FIG. 24, for example, upon detecting an activity of watching a product displayed on a shelf in a store, picking up a product, or handing a product to a clerk in front of a cash register (which is an example of a payment place), the server 10 transmits the product's coupon or product information such as the material and the production area to the user terminal 30. Appropriate services can also be provided according to various other activities.

The server 10 may send a special coupon to a user who picks up the same product every day at the same store. The server 10 may prepare an archaeological element for searching for a product for which a coupon can be obtained as gamification. The server 10 may recommend a recipe for a supper with a combination of products picked up by the user and may send an advertisement for insufficient products.

The server 10 may also deliver a coupon to a user who has stayed at a restaurant such as a cafe for a long time to induce additional orders.

The proximity determination of the BLE beacon may cause delivery to a wrong user terminal if there are multiple customers, but in the present embodiment, the user can be precisely detected using PDR (that is, positioning based on motion sensor data). In addition, because PDR and cameras are combined, an excessive number of environmental cameras that cover the entire floor are not always necessary, the setup in stores is easy, and the maintenance cost can be reduced.

5-2. Second Application Example

Transmitting coupons for enticing users to a physical store, the server 10 can measure the marketing effect using data on the activity of users who have actually visited the store, products that have attracted interest, and purchased products. It also becomes possible to precisely collect data such as products that have not been purchased even though users have reached them in the physical store, products that users have passed by, and other products that have been picked up and compared.

When camera video is used alone, the user cannot be associated with an account on a website or an application unless his or her activity data in the real world is collected after he or she is identified by a certain authentication method, but in the present embodiment, the user can be easily associated with data because the position can be detected using PDR of the user terminal.

5-3. Third Application Example

Subsequently, a case where authentication information is used for payment processing will be described with reference to FIGS. 25 and 26.

Figure 25:
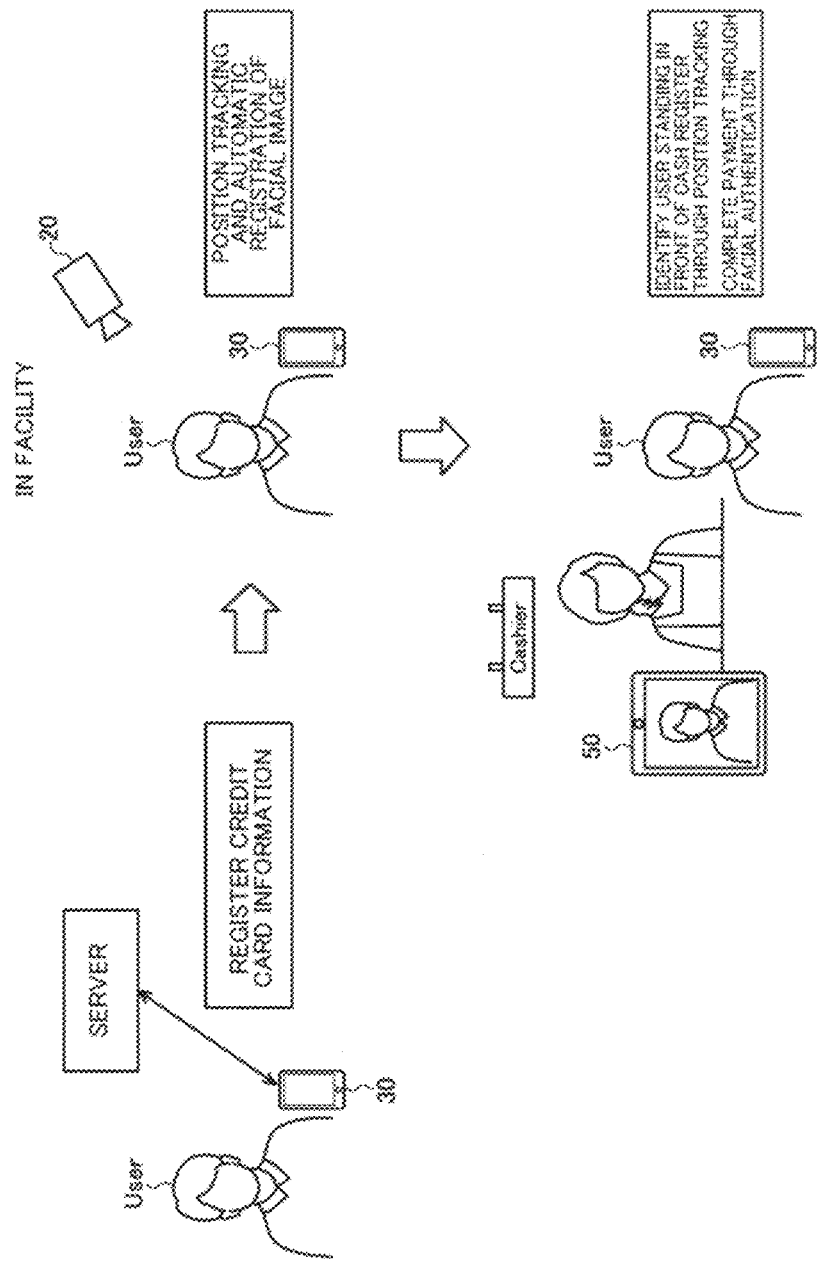
FIG. 25 is a diagram illustrating a payment process using authentication information according to an application example of the present embodiment.

FIG. 25 is a diagram illustrating a payment process using authentication information according to an application example of the present embodiment. As shown in FIG. 25, the user registers credit card information in the server 10 in advance. The server 10 stores the user ID and the credit card information in association with each other. Here, credit card information is used as an example, but such information is not particularly limited as long as it is information with which payment can be made. Such information may be, for example, information with which payment can be made such as electronic money information, account information, or a mobile phone number.

After that, the current position of the user is tracked in the facility visited by the user by highly accurate position estimation (movement route acquisition) which combines indoor positioning of the user terminal 30 (acquisition of a movement vector derived from PDR) or the like with a movement vector derived from a captured image of the environmental camera 20 or the like as described in the above embodiment.

Next, the system (the server 10) determines who is a customer who has reached a predetermined place where payment is made such as an area in front of the cash register from the position information and identifies the user. Then, the user's face is photographed by a camera (a tablet terminal 50) placed in front of the cash register to perform facial authentication, and if authentication is successful, a payment can be made with the credit card information registered in advance. At this time, the user can make a payment empty-handed without taking out the user terminal 30.

A payment process using such authentication information will be specifically described with reference to FIG. 26 below. FIG. 26 is a sequence diagram showing an example of a flow of a payment process according to the application example of the present embodiment.

Figure 26:
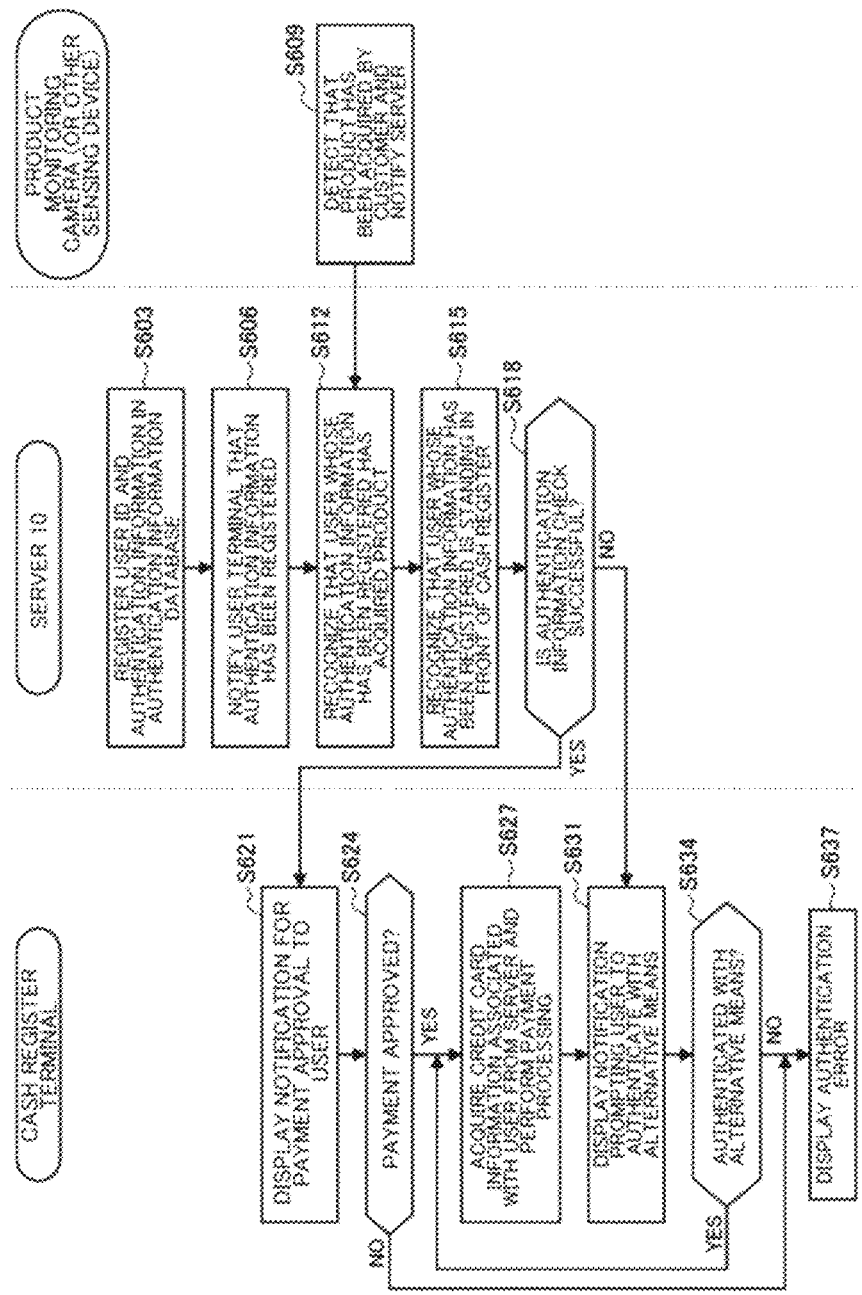
FIG. 26 is a sequence diagram showing an example of a flow of a payment process using authentication information according to an application example of the present embodiment.

As shown in FIG. 26, first, the server 10 registers the user ID and the authentication information in the authentication information database 123 (step S603) and notifies the user terminal 30 that the authentication information has been registered (step S606). The registration process of authentication information and the notification to the user are as described above.

Next, a product monitoring camera installed in the store analyzes a captured image, detects that a product has been acquired by a customer, and notifies the server 10 (step S609). The environmental camera 20 described above may be used instead of the product monitoring camera. A sensor device other than a camera may also be used (or may be used in combination).

Next, the server 10 recognizes that a user whose authentication information has been registered has acquired a product (step S612). "Acquiring a product" indicates, for example, a case where a product is put in a cart such as a shopping cart. The server 10 stores information on the acquired product in association with the user ID.

Next, the server 10 recognizes that the user whose authentication information has been registered is standing in front of the cash register (step S615). For example, the server 10 estimates the person in front of the cash register based on the movement route of the user acquired in real time.

Next, the server 10 checks the authentication information of the user standing in front of the cash register (Yes in step S618). Specifically, the server 10 checks a facial image or the like of the user that has been automatically registered in the authentication information database 123 with a facial image of the person standing in front of the cash register. A camera for facial authentication is installed in front of the cash register and photographs the face of the person who is in front of the cash register. The check of the authentication information (personal authentication) may be performed by the cash register terminal or may be performed by the server 10.

Next, when the check of the authentication information (such as facial authentication) is successful (Yes in step S618), the cash register terminal displays a notification for payment approval to the user on a touch panel display or the like installed toward the user (step S621). For example, the cash register terminal displays a message such as "Do you want to pay? YES/NO." To make a payment, the user taps the "YES" button.

Next, when the payment is approved (Yes in step S624), the cash register terminal acquires the credit card information associated with the user from the server 10 and performs payment processing (step S627). The credit card information of the user can be registered in association with the user ID in advance, for example, when the user creates an account in order to use the present system. Thus, the user can perform the payment process using the authentication information that has been automatically registered in the facility and associated with his or her user ID without taking out the user terminal 30 or the credit card at the cash register. The payment process using the credit card information can also be performed by the server 10.

On the other hand, when the check of the authentication information fails (No in step S618), the cash register terminal displays a notification prompting the user to perform authentication with an alternative means (step S631). For example, the cash register terminal displays, for example, "To pay, please authenticate with your smartphone". The user may start an application of the present system and input a biometric authentication (such as a fingerprint authentication), a passcode, or the like on the user terminal 30 to perform authentication.

Next, when authentication is done using an alternative means (Yes in step S634), the cash register terminal acquires the credit card information associated with the user from the server 10 and performs payment processing (step S627).

On the other hand, when authentication is not done using an alternative means (No in step S634) or when the payment is not approved (No in step S624), the cash register terminal displays that the authentication of the present system has an error (step S637). In this case, the user can make a payment with cash, a credit card on hand, electronic money, or the like.

In the above application example, an empty-handed payment process using authentication information has been described, but the present embodiment is not limited to this. For example, an empty-handed payment process can be performed using position information and a payment personal identification number. This will be described below with reference to FIG. 27.

Figure 27:
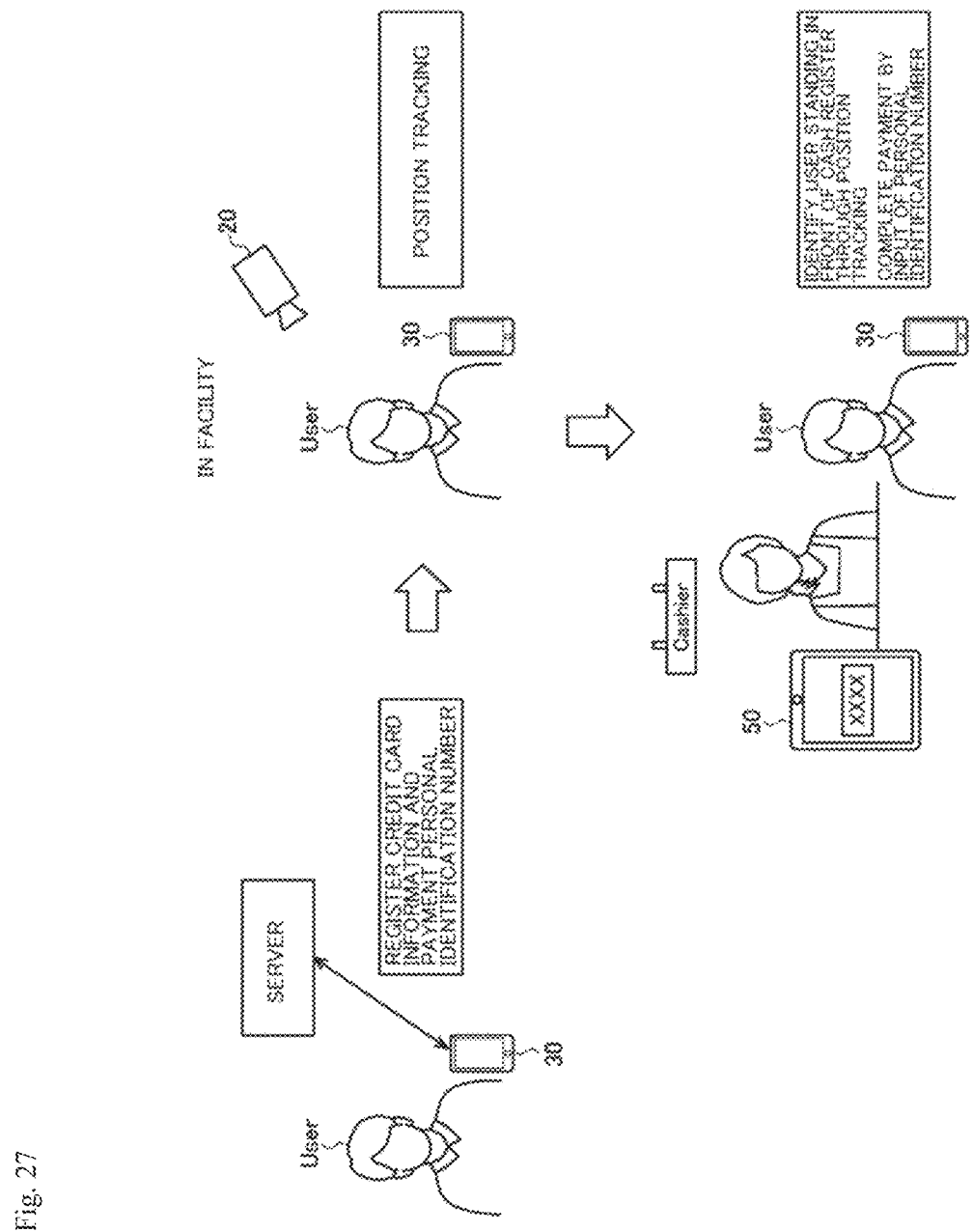
FIG. 27 is a diagram illustrating a payment process using position information and a payment personal identification number according to an application example of the present embodiment.

FIG. 27 is a diagram illustrating a payment process using position information and a payment personal identification number. As shown in FIG. 27, the user registers credit card information and a payment personal identification number (for example, a 4-digit number) in the server 10 in advance. The server 10 stores the user ID, the credit card information, and the payment personal identification number in association with each other. Here, credit card information is used as an example, but such information is not particularly limited as long as it is information with which payment can be made. Such information may be, for example, information with which payment can be made such as electronic money information, account information, or a mobile phone number.

After that, the current position of the user is tracked in the facility visited by the user by highly accurate position estimation (movement route acquisition) which combines indoor positioning of the user terminal 30 (acquisition of a movement vector derived from PDR) or the like with a movement vector derived from a captured image of the environmental camera 20 or the like as described in the above embodiment.

Next, the system (the server 10) determines who is a customer who has reached the accounting place (an area in front of the cash register) from the position information and identifies the user. Then, a screen for inputting a payment personal identification number is displayed on the tablet terminal 50 placed in front of the cash register. The cash register terminal can make a payment with credit card information registered in the server 10 in advance when the payment personal identification number input through the tablet terminal 50 matches a payment personal identification number associated with the identified user ID (acquired from the server 10) (that is, when authentication is successful). At this time, the user can make a payment empty-handed without taking out the user terminal 30.

The authentication process and the payment process using the credit card information may also be performed by the server 10.

A system that transmits position information to the store when the user has approached the cash register and tapped the smartphone (the user terminal 30) in his or her pocket or the like several times with his finger may also be provided in order to give consideration to the privacy of position information. The user terminal 30 performs control for transmitting PDR position information or the like to the server 10 upon detecting that it has been tapped several times through a sensor.

The server 10 may perform gait authentication that estimates the identity of the user according to the way the user walks in order to reduce anxiety when the user loses the user terminal 30.

A system that performs a payment process when the user has taken a product from a product shelf can be realized as another example of the empty-handed payment process described above. The server 10 performs a payment process using credit card information or the like that has been associated with the user ID of the user, who has taken the product, using the association between the user terminal 30 (the user ID) and position information (a movement route) acquired based on information obtained from the user terminal 30 and information obtained from the environmental camera 20.

The product having been taken from the shelf can be detected, for example, by a weight sensor provided on the shelf or an environmental camera 20 provided around the shelf. The person in front of the shelf has already been captured by the environmental camera 20 and the PDR. Upon confirming that a change corresponding to only one product has been made through the weight sensor, the server 10 performs a payment process by the credit card information or the like associated with the user ID of the person in front of the shelf. Then, the server 10 notifies the user terminal 30 of the payment result.

5-5. Fifth Application Example

In another application example of the present embodiment, it is possible to automatically determine the product picking status of each store clerk (as to who has picked which and how many products). This makes it easier to manage products in the store and record product pickings. It is also possible to notify a wearable device used by a store clerk of an advice (such as an arrangement method) according to products being picked.

5-6. Sixth Application Example

In another application example of the present embodiment, hotel check-in can be unmanned. The user makes a hotel reservation and registers identity information on the application of the present system installed in the user terminal 30 (or on a website) in advance.

The server 10 identifies (associates) the user based on information obtained from the user terminal 30 and information obtained from the environmental camera until he or she arrives at the front desk from when he or she enters a building containing the hotel and automatically registers authentication information (for example, a facial image) obtained from an image captured by the environmental camera 20.

Next, the server 10 identifies the user who has visited the front desk by indoor positioning and displays a room number for the user on a digital signage that the user has approached. For example, a screen such as "Welcome to Mr. XX. Please go to the room directly. The room number is "4122"." is displayed. When the user (guest) has checked the room number and gone to the room directly, the server 10 performs facial authentication with a camera provided on a door of the room. Specifically, the server 10 compares a facial image taken by the camera provided on the door of the room with the facial image of the authentication information that has been automatically registered to perform identity authentication (facial authentication). If the authentication is successful, the server 10 uses information of the user registered in advance as guest information for check-in and performs a check-in process. Then, when the check-in process is completed, the server 10 unlocks the door of the room.

After that, the server 10 can automatically call an elevator in the hall and unlock/open the door based on position information and authentication information. The server 10 can also process an automatic payment for a restaurant or a fitness service such as a pool in the building through identity authentication using position information and authentication information.

5-7. Seventh Application Example

The present embodiment can also be applied to meeting navigation in the hall. Specifically, position information in the hall can be shared among a plurality of user IDs and used for a meeting.

The user registers another user ID on the application in advance in order to use position information in the hall for the meeting. For example, the user lets a QR code (registered trademark) indicating a user ID of a friend be displayed on an application installed on a user terminal of the friend and then reads the QR code with his or her own user terminal 30 to register the user ID of the friend (before entering the hall). The server 10 registers the registered user ID of the friend as a partner with whom to share position information of the user. Both the user and the friend may grant permission to disclose position information on their applications.

Figure 28:
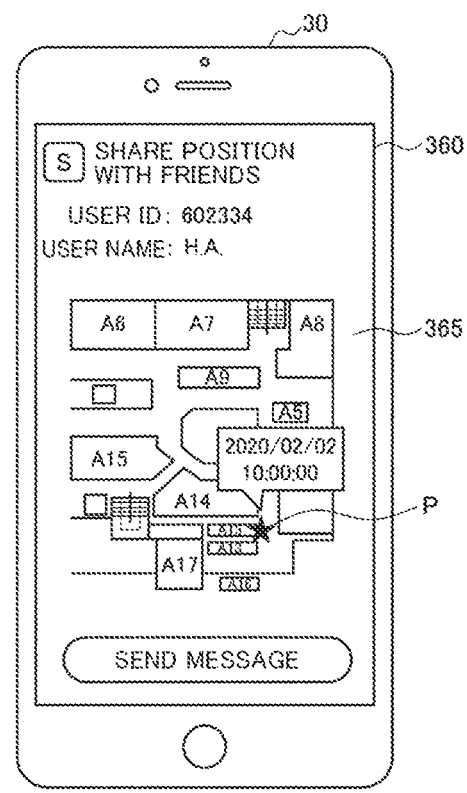
FIG. 28 is a diagram showing an example of a position information sharing screen according to an application example of the present embodiment.

Next, when desiring to meet the friend again after taking another activity with him or her, the user opens the application on the user terminal 30 and selects the registered user ID of the partner. Current position information of the selected user ID is displayed on the user terminal 30. Here, FIG. 28 shows an example of a position information sharing screen according to an application example of the present embodiment. For example, an indication P indicating the location of the partner and information indicating the time at the location are displayed on a floor map on a position information sharing screen 365 as shown in FIG. 28.

When the user and the friend have left the facility, the server 10 may delete their disclosure permission (delete the user ID registered as a partner with whom to share position information).

5-8. Eighth Application Example

The present embodiment can also be applied to a photo spot service in the hall. Specifically, this is a service in which a photograph taken by a camera installed in a photo spot in the facility is sent to the subject's smartphone or the like (user terminal 30).

The person who has visited the facility has already been captured by the environmental camera 20 installed in the facility and PDR (an example of indoor positioning) on the user terminal 30. Then, if the user enters the photo spot and poses, the camera installed in the photo spot automatically starts photographing. Next, the captured photograph is automatically uploaded to the server 10 and the server 10 generates a download URL that is valid for a certain period of time for each user. Then, when the user has left the photo spot after taking a photograph, the server 10 notifies the user's smartphone or the like (user terminal 30) of the download URL.

5-9. Ninth Application Example

The present embodiment can also be applied to a system in which a person in charge, a business marketer, or the like of the facility notifies an arbitrary user of information based on captured video of visitors in the facility.

Figure 29:
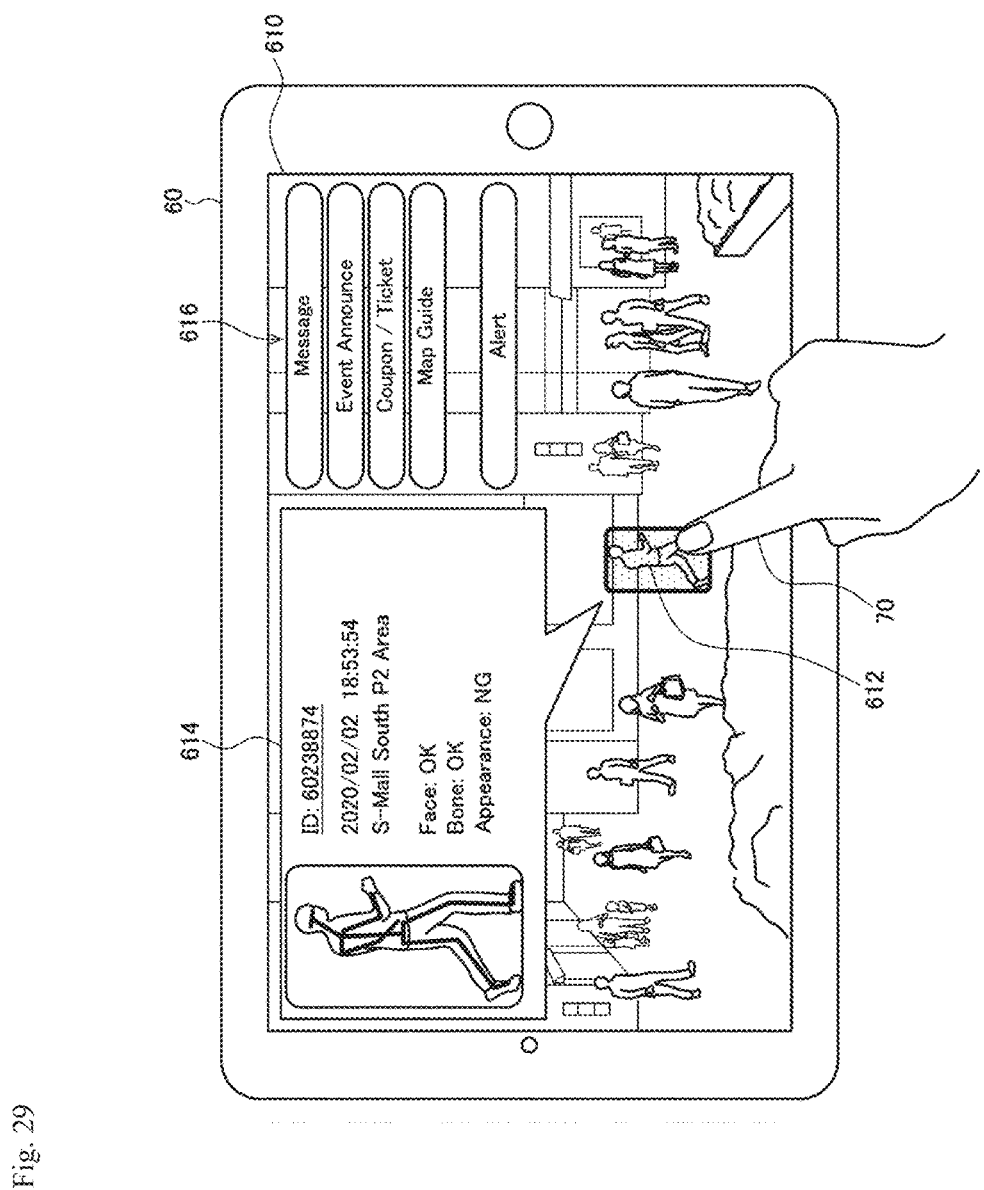
FIG. 29 is a diagram showing an example of an operation screen for selecting an arbitrary user from video in a facility and notifying of information according to an application example of the present embodiment.

Specifically, the person in charge or the like of the facility selects an arbitrary user from the captured video of visitors in the facility. Here, FIG. 29 shows an example of an operation screen for selecting an arbitrary user from video in the facility and notifying the selected user of information. As shown in FIG. 29, a person in charge 70 performs an operation of tapping an arbitrary user 612 in video captured by an environmental camera 20 displayed on a display unit 610 of a manager tablet terminal 60. When an association can be made with the selected user 612 (moving object), acquired information 614 (such as, for example, a user ID, the success or failure of acquisition of a facial image, and the success or failure of acquisition of bone information) is displayed on the display unit 610. Next, the person in charge 70 selects notification information to be provided to the selected user 612 from notification content selection items 616. Examples of the notification content selection items 616 include a message notification, an event guide, a notification of a coupon or the like, a map guide notification, a warning, and the like. Then, the server 10 transmits predetermined information (selected by the person in charge or the like of the facility) to a user terminal 30 of the selected user.

In this way, the person in charge or a business marketer of the facility can directly select a user from video of the environmental camera 20 and notify the selected user of arbitrary information (such as a message, event information, a coupon, a map guide, or a warning). Customer satisfaction can be improved and the marketing effect can be expected because the person in charge can view the states of visitors and individually notify them of appropriate information. For example, it is possible to distribute coupon information to people in a target group of a store who are walking in front of the store, thus encouraging them to enter the store. It is also possible to immediately assist customers who are lost on the floor by notifying them of floor guide information. In addition, it is possible to directly and inconspicuously warn visitors who have violated prohibited conduct or etiquette rules.

5-10. Tenth Application Example

The present embodiment can also be applied to a game using the real world.

For example, in an alternate reality game performed in a facility, an activity in the real world may be used as a trigger for an event in the game. An alternate reality game is a hands-on play that incorporates the everyday world as a part of the game and alternates the reality and imagination.

Specifically, for example, if one performs a predetermined activity at a predetermined place in the facility, he or she will receive an item in the game or a gift will be mailed to his or her home. Not only position information but also an activity of the user can be included and used as a trigger because the person who has visited the facility has already been captured by the environmental camera 20 installed in the facility and PDR (an example of indoor positioning) of the user terminal 30 and activity information of the user can also be acquired by the user terminal 30 or the environmental camera 20. This makes it possible to provide more real-world oriented content.

Alternate reality games can be played not only indoors but also outdoors. For example, if one reproduces a specific pose made by a character in a specific outdoor place (for example, a shrine or a park) that appears in an animation, a camera installed in that place automatically captures a corresponding image and transmits the captured image to the user terminal 30.

5-11. Eleventh Application Example

The present embodiment is also applied to outdoor events, outdoor attractions, or the like.

People who have visited a specific outdoor location have already been captured by the environmental camera 20 installed at the outdoor location and PDR (or satellite positioning) of their user terminals 30 and activity information of the users can also be acquired by the user terminals 30 or the environmental camera 20.

The server 10 can automatically determine the shape of a queue and the situation of people in line using the environmental camera 20 and the user terminals 30 and individually provide appropriate information to each user according to the situation of the line or the like.

For example, if the line is not in an arbitrary shape, the server 10 notifies an employee of a part which is not in the arbitrary shape or notifies user terminals 30 of people who are not lined up in the arbitrary shape to urge them to correct their line.

The server 10 may also notify people in line of their waiting times or the like according to a location where they are in line. The server 10 may also determine the shape of the line and the situation of people in line and notify the store of the situation.

In addition, the server 10 may perform processing for sending menu information to people in line and creating items selected by them (or items that match the tastes of the users in line) in advance and carrying the items to the place of the orderers by a self-propelled robot or the like, and when the items have been acquired by the orderers, completing a payment process on the spot.

5-12. Twelfth Application Example

The present embodiment can also be applied to operations in hospitals.

For example, the server 10 can manage information regarding activities (position information and work information) of hospital staff in a hospital and their entry into the hospital or rooms in the hospital by using user terminals 30 carried by the staff and environmental cameras 20 in the hospital. When facial information of staff cannot be acquired due to masks, the server 10 may permit their entry into the hospital or rooms mainly based on their position information. The server 10 can also manage whether staff is heading for a patient who is in urgent need of care.

The server 10 can also manage the situations of patients in the hospital by using user terminals 30 carried by the patients and environmental cameras 20 in the hospital. For example, the server 10 can determine where a dementia patient is in the hospital. The server 10 can also determine the positions of patients based on position information even in a place where no cameras are provided. The server 10 can also determine examination information of patients by facial authentication.

The device type of the user terminals 30 may be, for example, a wristband or clip type (a wearable device) since it can be assumed that there are situations in which smartphones, mobile phone terminals, or the like are not carried in hospitals. Further, when wearable devices are used, the user terminals 30 can acquire various biological information such as heartbeat, veins, the amount of sweating, myoelectric values, and brain waves if they are in a shape touching the skin.

6. Summary

In the information processing system according to the embodiments of the present disclosure, it is possible to accurately identify a person imaged in a captured image, that is, to associate a person imaged in a captured image with a user, whether indoors or outdoors, as described above.

Although the preferred embodiments of the present disclosure have been described in detail with reference to the accompanying drawings, the present technology is not limited to such examples. It is clear that a person with ordinary knowledge in the technical field of the present disclosure can make various modifications or changes without departing from the scope of technical ideas set forth in the claims, and of course, these are understood to fall within the technical scope of the present disclosure.

For example, a computer program for causing hardware such as CPUs, ROMs, and RAMS provided in the server 10, the environmental camera 20, or the user terminal 30 described above to implement the functions of the server 10, the environmental camera 20, or the user terminal 30 can also be created. A computer-readable storage medium that stores the computer program is also provided.

The advantages described in the present specification are merely explanatory or exemplary and are not limited. That is, the techniques according to the present disclosure may have other advantages apparent to those skilled in the art from the description herein in addition to or in place of the above advantages.

The present technology can also provide the following configurations.

(1) An information processing device including a control unit configured to perform control for associating a person imaged in a captured image with a user of an information processing terminal based on a check between movement information acquired from information detected by the information processing terminal carried by the user and movement information of one or more persons acquired from the captured image and a check between state information of the user acquired from the information processing terminal and state information of the one or more persons acquired from the captured image.

(2) The information processing device according to (1), wherein the state information includes information that can be recognized from outside.

(3) The information processing device according to (1) or (2), wherein the state information of the user is extracted from sensing data acquired by a sensor provided in the information processing terminal.

(4) The information processing device according to any one of (1) to (3), wherein the state information of the persons is extracted from the captured image through image analysis.

(5) The information processing device according to any one of (1) to (4), wherein the state information is feature information relating to walking.

(6) The information processing device according to any one of (1) to (5), wherein the state information is information relating to a position.

(7) The information processing device according to any one of (1) to (6), wherein the state information is information relating to a distance.

(8) The information processing device according to any one of (1) to (7), wherein the state information includes a positional relationship between the user and another user present near the user and a positional relationship between the user and a camera configured to acquire the captured image.

(9) The information processing device according to any one of (1) to (8), wherein the state information is activity information.

(10) The information processing device according to any one of (1) to (9), wherein the state information is a movement pattern estimated according to a preset rule.
(11) The information processing device according to (10), wherein the control unit is configured to perform a check of the movement pattern based on movement information of the information processing terminal and an appearance feature of each person obtained from captured images obtained from a plurality of cameras.
(12) The information processing device according to any one of (1) to (11), wherein the control unit is configured to perform control for storing a character string for identifying the user that has been registered in advance and authentication information of the associated person extracted from a captured image of the associated person in a storage unit according to the association.
(13) The information processing device according to (12), wherein the control unit is configured to perform control for notifying the information processing terminal that the authentication information has been stored.
(14) The information processing device according to any one of (1) to (13), wherein the control unit is configured to calculate check confidence scores for each person imaged in the captured image in the check of the movement information and the check of the state information and associate a person for whom a sum of the check confidence scores obtained for each person is a maximum with the user.
(15) The information processing device according to any one of (1) to (14), wherein the movement information of the information processing terminal includes indoor positioning information.
(16) The information processing device according to any one of (1) to (15), wherein the control unit is configured to perform control for storing movement trajectory information which is movement information of the information processing terminal in the storage unit as a route history of the user and updating the route history of the user based on movement trajectory information acquired from the captured image of the associated person when the person has been associated with the user.
(17) The information processing device according to any one of (1) to (16), wherein the control unit is configured to perform control for notifying the information processing terminal of appropriate information according to an activity of the user with whom the person has been associated.
(18) The information processing device according to any one of (1) to (17), wherein the control unit is configured to identify a person who is at a predetermined place where payment is performed with reference to a route history of each user stored in the storage unit, and to perform a check of authentication information acquired from a captured image of the person who is at the predetermined place where payment is performed by using authentication information of the identified user so as to perform personal authentication for payment approval.
(19) An information processing method including a processor performing control for associating a person imaged in a captured image with a user of an information processing terminal based on a check between movement information acquired from information detected by the information processing terminal carried by the user and movement information of one or more persons acquired from the captured image and a check between state information of the user acquired from the information processing terminal and state information of the one or more persons acquired from the captured image.
(20) A program for causing a computer to function as a control unit configured to perform control for associating a person imaged in a captured image with a user of an information processing terminal based on a check between movement information acquired from information detected by the information processing terminal carried by the user and movement information of one or more persons acquired from the captured image and a check between state information of the user acquired from the information processing terminal and state information of the one or more persons acquired from the captured image.

REFERENCE SIGNS LIST

10 Server
100 Control unit
101 Movement vector check unit
102 Walking step check unit
103 Positional relationship check unit
104 Activity information check unit
105 Movement pattern check unit
106 Association unit
107 Information registration unit
108 Route update unit
110 Communication unit
120 Storage unit
121 Captured image database
122 Route history database
123 Authentication information database
124 Undecided information database
125 Map information database
20 Environmental camera
30 User terminal

The invention claimed is:
1. An information processing device comprising:
circuitry configured to
　acquire movement information from information detected by an information processing terminal carried by a user, and
　perform control for associating a person imaged in a captured image with the user of the information processing terminal based on
　　a check between the movement information acquired from the information detected by the information processing terminal carried by the user and movement information of one or more persons acquired from the captured image, and
　　a check between state information of the user acquired from the information processing terminal and state information of the one or more persons acquired from the captured image,
wherein the state information includes a switching time between a first activity and a second activity indicated by the acquired movement information.
2. The information processing device according to claim 1,
wherein the state information further includes information that can be recognized from outside.

3. The information processing device according to claim 1,
  wherein the state information of the user is extracted from sensing data acquired by a sensor provided in the information processing terminal.

4. The information processing device according to claim 1, wherein
  the state information of the persons is extracted from the captured image through image analysis.

5. The information processing device according to claim 1,
  wherein the state information further includes feature information relating to walking.

6. The information processing device according to claim 1,
  wherein the state information further includes information relating to a position.

7. The information processing device according to claim 1,
  wherein the state information further includes information relating to a distance.

8. The information processing device according to claim 1,
  wherein the state information further includes
    a positional relationship between the user and another user present near the user, and
    a positional relationship between the user and a camera configured to acquire the captured image.

9. The information processing device according to claim 1,
  wherein the state information further includes activity information.

10. The information processing device according to claim 1,
  wherein the state information further includes a movement pattern estimated according to a preset rule.

11. The information processing device according to claim 10,
  wherein the circuitry is further configured to perform a check of the movement pattern based on movement information of the information processing terminal and an appearance feature of each person obtained from captured images obtained from a plurality of cameras.

12. The information processing device according to claim 1,
  wherein the circuitry is further configured to perform control for storing
    a character string for identifying the user that has been registered in advance, and
    authentication information of the associated person extracted from a captured image of the associated person in a storage unit according to the association.

13. The information processing device according to claim 12,
  wherein the circuitry is further configured to perform control for notifying the information processing terminal that the authentication information has been stored.

14. The information processing device according to claim 1,
  wherein the circuitry is further configured to
    calculate check confidence scores for each person imaged in the captured image in the check of the movement information and the check of the state information, and
    associate a person for whom a sum of the check confidence scores obtained for each person is a maximum with the user.

15. The information processing device according to claim 1,
  wherein the movement information of the information processing terminal includes indoor positioning information.

16. The information processing device according to claim 1,
  wherein the circuitry is further configured to
    perform control for storing movement trajectory information which is movement information of the information processing terminal in a storage unit as a route history of the user, and
    perform control for updating the route history of the user based on movement trajectory information acquired from the captured image of the associated person when the person has been associated with the user.

17. The information processing device according to claim 1, wherein
  the circuitry is further configured to perform control for notifying the information processing terminal of appropriate information according to an activity of the user with whom the person has been associated.

18. The information processing device according to claim 1,
  wherein the circuitry is further configured to
  identify a person who is at a predetermined place where payment is performed based on a route history of each user stored in a storage unit and
  perform a check of authentication information acquired from a captured image of the person who is at the predetermined place where payment is performed by using authentication information of the identified user
  so as to perform personal authentication for payment approval.

19. An information processing method comprising:
  acquiring movement information from information detected by an information processing terminal carried by a user; and
  performing control, by a processor, for associating a person imaged in a captured image with the user of the information processing terminal based on
    a check between the movement information acquired from the information detected by the information processing terminal carried by the user and movement information of one or more persons acquired from the captured image, and
    a check between state information of the user acquired from the information processing terminal and state information of the one or more persons acquired from the captured image,
  wherein the state information includes a switching time between a first activity and a second activity indicated by the acquired movement information.

20. A non-transitory computer-readable storage medium having embodied thereon a program, which when executed by a computer causes the computer to execute a method, the method comprising:
  acquiring movement information from information detected by an information processing terminal carried by a user; and
  associating a person imaged in a captured image with the user of the information processing terminal based on
    a check between the movement information acquired from the information detected by the information processing terminal carried by the user and movement information of one or more persons acquired from the captured image, and a check between state information of the user acquired from the information processing terminal and state information of the one or more persons acquired from the captured image, wherein the state information includes a switching time between a first activity and a second activity indicated by the acquired movement information.

* * * * *